US012422667B2

(12) United States Patent
Imai

(10) Patent No.: US 12,422,667 B2
(45) Date of Patent: Sep. 23, 2025

(54) OPTICAL SYSTEM, IMAGING APPARATUS, AND PROJECTION APPARATUS

(71) Applicant: NEC Corporation, Tokyo (JP)

(72) Inventor: Hiroshi Imai, Tokyo (JP)

(73) Assignee: NEC CORPORATION, Tokyo (JP)

(*) Notice: Subject to any disclaimer, the term of this patent is extended or adjusted under 35 U.S.C. 154(b) by 120 days.

(21) Appl. No.: 18/567,064

(22) PCT Filed: Jun. 9, 2021

(86) PCT No.: PCT/JP2021/021942
§ 371 (c)(1),
(2) Date: Dec. 5, 2023

(87) PCT Pub. No.: WO2022/259428
PCT Pub. Date: Dec. 15, 2022

(65) Prior Publication Data
US 2024/0264431 A1 Aug. 8, 2024

(51) Int. Cl.
G02B 26/08 (2006.01)
H04N 23/55 (2023.01)

(52) U.S. Cl.
CPC .......... G02B 26/0883 (2013.01); H04N 23/55 (2023.01)

(58) Field of Classification Search
CPC ................ G02B 26/08; G02B 26/0883; G02B 27/0172; H04N 23/55
See application file for complete search history.

(56) References Cited

U.S. PATENT DOCUMENTS

| 5,815,741 A | * | 9/1998 | Okuyama | G02B 27/017 250/221 |
| 2014/0226215 A1 | * | 8/2014 | Komatsu | G02B 27/0172 359/631 |
| 2017/0315358 A1 | * | 11/2017 | Masuda | G02B 6/002 |
| 2021/0011293 A1 | * | 1/2021 | Kanaya | G02B 27/1086 |
| 2021/0063749 A1 | * | 3/2021 | Takeda | G02B 5/04 |
| 2021/0263319 A1 | * | 8/2021 | Dimov | G02B 27/0172 |
| 2021/0400193 A1 | * | 12/2021 | Ma | H04N 23/95 |

FOREIGN PATENT DOCUMENTS

| JP | S60-176017 A | 9/1985 |
| JP | H05-122451 A | 5/1993 |
| JP | 2005-223897 A | 8/2005 |
| JP | 2007-094095 A | 4/2007 |
| JP | 2008-225455 A | 9/2008 |
| JP | 2014-106453 A | 6/2014 |
| JP | 2018-174362 A | 11/2018 |

OTHER PUBLICATIONS

International Search Report for PCT Application No. PCT/JP2021/021942, mailed on Sep. 7, 2021.
English translation of Written opinion for PCT Application No. PCT/JP2021/021942, mailed on Sep. 7, 2021.

* cited by examiner

Primary Examiner — Amy R Hsu

(57) ABSTRACT

An optical system including: an imaging element configured to convert light into an electric signal; a lens configured to deflect and converge the light; and a prism disposed in an optical path between the imaging element and the lens, wherein a virtual image of a light receiving surface of the imaging element is formed in the prism and a focusing surface is at a position conjugate with the virtual image with the lens interposed therebetween.

7 Claims, 22 Drawing Sheets

A

TOP VIEW

B

TOP VIEW

SIDE VIEW

SIDE VIEW

TOP VIEW

A

B

SIDE VIEW

SIDE VIEW

A

SIDE VIEW

B

SIDE VIEW

A

SIDE VIEW

B

SIDE VIEW

C

SIDE VIEW

OPTICAL SYSTEM, IMAGING APPARATUS, AND PROJECTION APPARATUS

This application is a National Stage Entry of PCT/JP2021/021942 filed on Jun. 9, 2021, the contents of all of which are incorporated herein by reference, in their entirety.

TECHNICAL FIELD

The present invention relates to an optical system used for focusing, and an imaging apparatus and a projection apparatus in which the optical system is used.

BACKGROUND ART

In an imaging apparatus that is used for object recognition such as face authentication and iris authentication and that captures an image of an imaging surface in which a subject has depth differences, an image in which the entirety of the subject is in focus is required in order to enhance the accuracy of authentication and recognition.

Also, in a projection apparatus for projecting and displaying an image on a projected surface such as a screen having depth differences, an image in which the entirety of the projected surface is in focus is also required.

However, conventional imaging apparatuses are manufactured so as to focus on a surface orthogonal to an optical axis of an imaging lens. Also, conventional projection apparatuses are manufactured so as to focus on a surface orthogonal to an optical axis of a projection lens. For this reason, with the imaging apparatus and the projection apparatus described above, it is difficult to focus on multiple locations of a surface.

Patent Document 1 discloses a method for focusing on an inclined surface with depth differences. According to a technique disclosed in Patent Document 1, a reflection mirror having a specific aspect is disposed between a document surface (imaging surface) and an imaging element.

Patent Document 2 discloses a method for focusing on an inclined surface with depth differences. According to a technique disclosed in Patent Document 2, a reflection mirror having a specific aspect is disposed between a spatial light modulator such as a liquid crystal and a DMD (Digital Mirror Device) and a projected surface.

LIST OF RELATED ART DOCUMENTS

Patent Document

Patent Document 1: Japanese Patent Laid-Open Publication No. 2018-174362
Patent Document 2: Japanese Patent Laid-Open Publication No. 2008-225455

SUMMARY

Technical Problems

Incidentally, in a system used for object recognition such as face authentication and iris authentication as shown in FIG. 1A, there are cases where an imaging apparatus 1 is present in an oblique direction with respect to an imaged person 2. As such, a location different from a face of the imaged person 2 parallel with an imaging surface 4, that is, a focusing surface 3 orthogonally intersecting an optical axis 5 (dashed line) is focused on. In such a case, since only an image in which only a portion of the face of the imaged person 2 is in focus can be obtained, it is difficult to perform accurate face authentication and iris authentication.

Also, in a technique disclosed in Patent Document 1, a sculptured surface mirror is generally used for a reflection mirror having a specific aspect, and thus manufacturing cost is high. Accordingly, the optical system is expensive.

Further, it is difficult to manufacture a reflection mirror that forms a plurality of focusing surfaces 3 that focus respectively on the faces of imaged persons 2a and 2b facing different directions as in FIG. 1B, and the degree of freedom of design is low. Further, since the above reflection mirror has a size corresponding to an imaging angle of view, the size of the optical system is increased.

Next, in a system used for projection as shown in FIG. 2A, a projection apparatus 6 is present in an oblique direction with respect to a projected surface 7. As such, a focusing surface 9 (dashed line) intersecting orthogonally to the optical axis 8 (dashed line) is focused on. That is, a location different from the projected surface 7 is focused on.

Further, in a technique disclosed in Patent Document 2, since a sculptured surface mirror is generally used for a reflection mirror having a specific aspect, the manufacturing cost is high. As such, the optical system is expensive.

Further, as shown in FIG. 2B, when the projected surface 7 on which the depth changes discontinuously is focused on, it is difficult to manufacture the reflection mirror, and the degree of freedom of design is low. Further, since the above reflection mirror has a size corresponding to a projecting angle of view, the size of the optical system is increased.

An aim of an aspect is to provide an optical system capable of focusing on multiple locations, and that is small and inexpensive, and an imaging apparatus and a projection apparatus using the optical system.

Solution to the Problems

In order to achieve the example object described above, an optical system according to an example aspect includes:
an imaging element that converts light into an electric signal;
a lens that deflects and converges the light; and
a prism disposed in an optical path between the imaging element and the lens,
wherein a virtual image of a light receiving surface of the imaging element is formed in the prism and a focusing surface is at a position conjugate with the virtual image with the lens interposed therebetween.

Also, in order to achieve the example object described above, an imaging apparatus according to an example aspect includes:
an imaging element that converts light into an electric signal;
a lens that deflects and converges the light; and
a prism disposed in an optical path between the imaging element and the lens,
wherein a virtual image of a light receiving surface of the imaging element is formed in the prism and a focusing surface is at a position conjugate with the virtual image with the lens interposed therebetween.

Also, in order to achieve the example object described above, an optical system according to an example aspect includes:
a display element that displays an image;
a lens that deflects and converges light; and
a prism disposed in an optical path between the display element and the lens, wherein a virtual image of a surface of the display element is formed in the prism and a projected surface is at a position conjugate with the virtual image with the lens interposed therebetween.

Also, in order to achieve the example object described above, a projection apparatus according to an example aspect includes:

a display element that displays an image;
a lens configured to deflect and converge light; and
a prism disposed in an optical path between the display element and the lens,
wherein a virtual image of a surface of the display element is formed in the prism and a projected surface is at a position conjugate with the virtual image with the lens interposed therebetween.

Advantageous Effects of the Invention

As one aspect, it is possible to focusing on multiple locations, and that is small and inexpensive.

EXAMPLE EMBODIMENT

Figure 1:
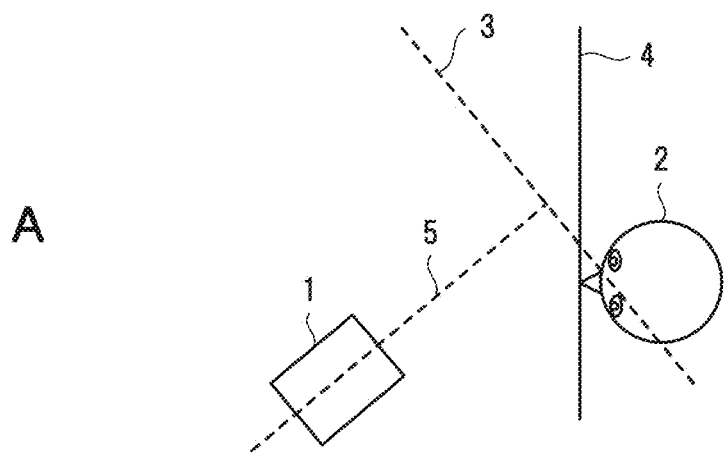
FIG. 1 is a diagram for illustrating a conventional imaging apparatus.
Figure 1:
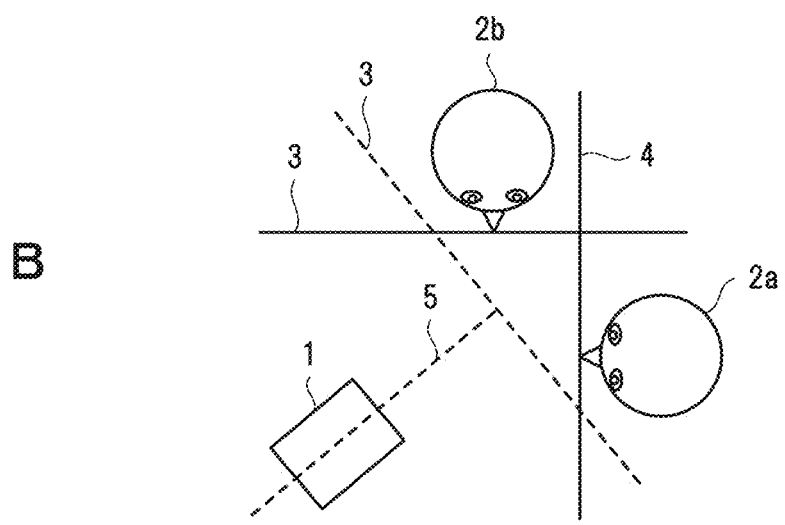
Figure 2:
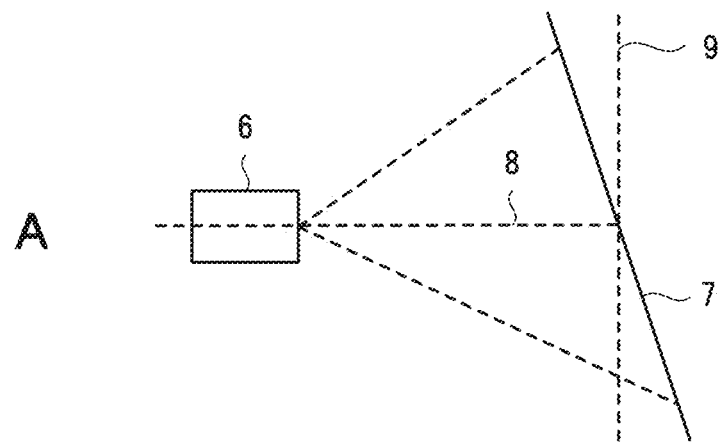
FIG. 2 is a diagram for illustrating a conventional projection apparatus.
Figure 2:
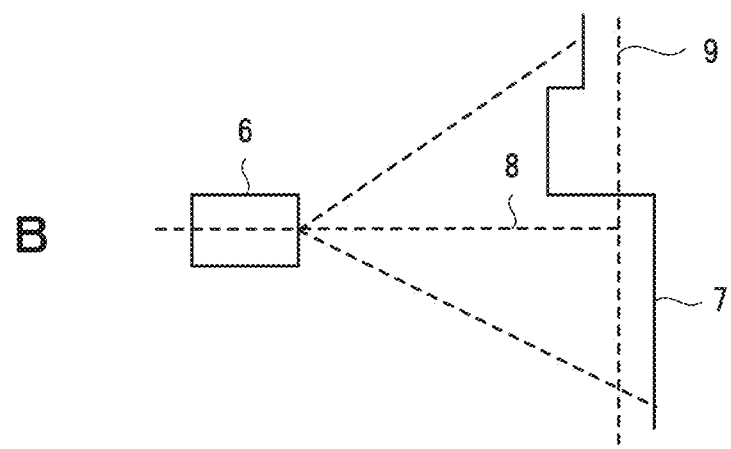

In the following, an example embodiment of the invention will be described with reference to the drawings. In the drawings described below, elements having identical or corresponding functions will be assigned the same reference signs, and redundant descriptions thereof may be omitted.

First Example Embodiment

Figure 3:
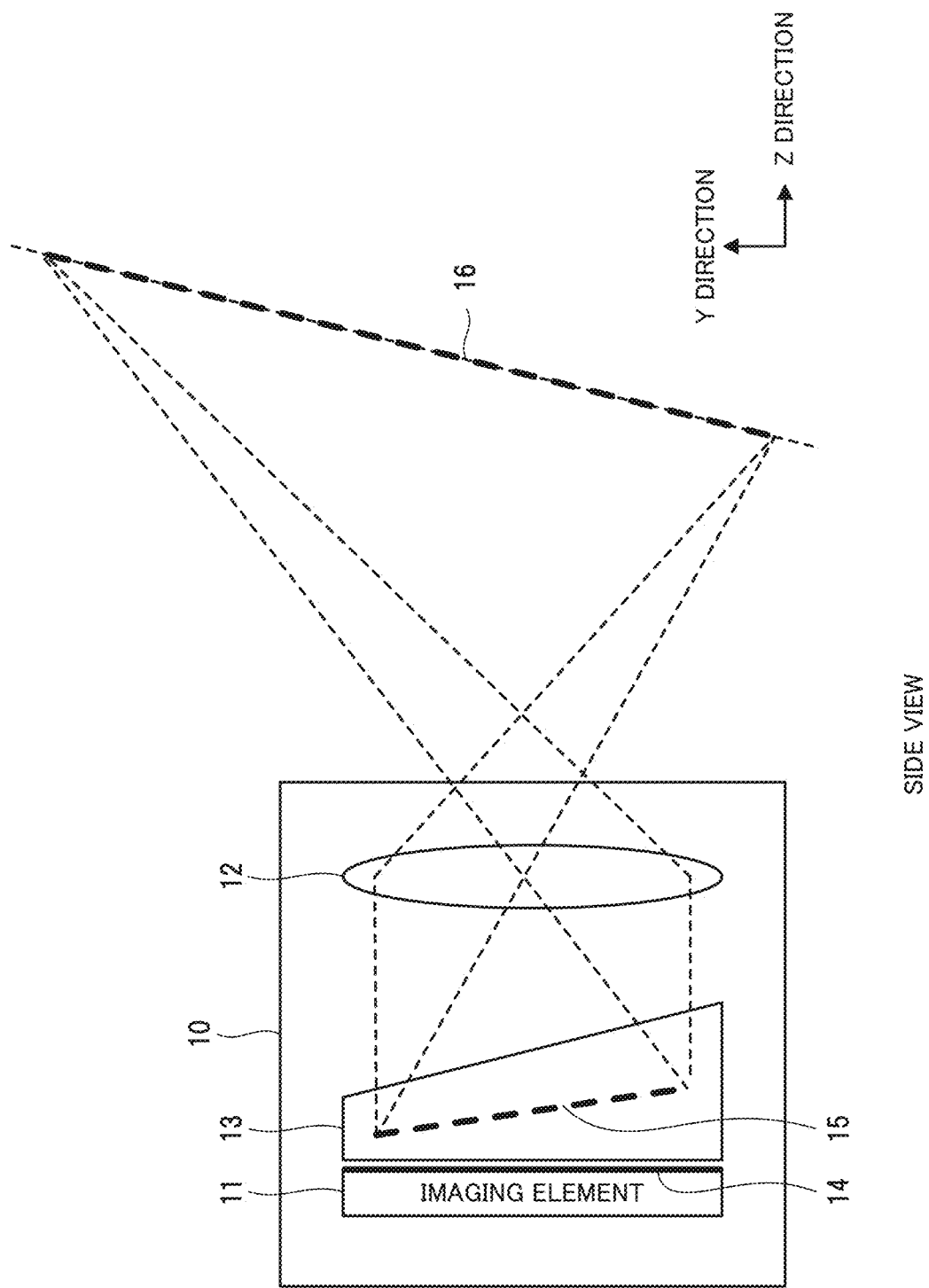
FIG. 3 is a diagram for illustrating an example of an optical system of the first example embodiment.

The configuration of the optical system 10 according to a first example embodiment will be described below with reference to FIG. 3. FIG. 3 is a diagram for illustrating an example of an optical system of the first example embodiment.

[Apparatus Configuration]

The optical system 10 shown in FIG. 3 has a configuration capable of focusing on multiple locations. Also, as shown in FIG. 3, the optical system 10 includes an imaging element 11, a lens 12, and a prism 13.

The imaging element 11 is a device for converting light incident from the lens 12 into an electric signal. Examples of the imaging element 11 include a CMOS (Complementary Metal Oxide Semiconductor) image sensor, a CCD (Charge Coupled Device) image sensor, and an InGaAs (Indium gallium arsenide) sensor. However, the imaging element 11 is not limited to the above image sensors.

Regarding the resolution of the imaging element 11, it is conceivable to use a CMOS sensor with horizontal 1920 pixels×vertical 1080 pixels, a pixel pitch of 5 µm, and a frame rate of 60 fps. However, the imaging element 11 is not limited to the above resolution, pixel pitch, and frame rate.

The lens 12 is an optical element that refracts and converges light, and is a transparent body having spherical surfaces on both sides. The lens 12 may be, for example, a convex lens.

The prism 13 is an optical element for dispersing, refracting, totally reflecting, and double-refracting light, and is a polyhedron made of a transparent medium. Specifically, as shown in FIG. 3, the prism 13 is disposed in the optical path between the imaging element 11 and the lens 12.

The material for the prism 13 is, for example, glass, plastic, or the like. Note that the material for the prism 13 is not limited to glass or plastic, and may be any transparent material having effects similar to glass and plastic.

In the example of FIG. 3, a virtual image 15 of a light receiving surface 14 of the imaging element 11 is formed in the prism 13. Also, a focusing surface 16 in FIG. 3 is at a location conjugate with the virtual image 15 and the lens 12 in the optical system 10. That is, the focusing surface 16 and the virtual image 15 are in an image forming relationship (conjugate relationship).

Since the subject is required to be focused on the focusing surface 16, the shape of the prism 13 is formed such that the virtual image 15 of the light-receiving surface 14 of the imaging element 11 is formed in the prism 13 that is in an image forming relationship (conjugate relationship) with the focusing surface 16. That is, a conjugate image distance distribution having an image forming relationship with the focusing surface 16 (predetermined object distance distribution) is obtained, and the shape of the prism 13 that is a transmission optical member is set such that the image distance distribution matches the virtual image 15 of the light receiving surface 14.

Figure 4:
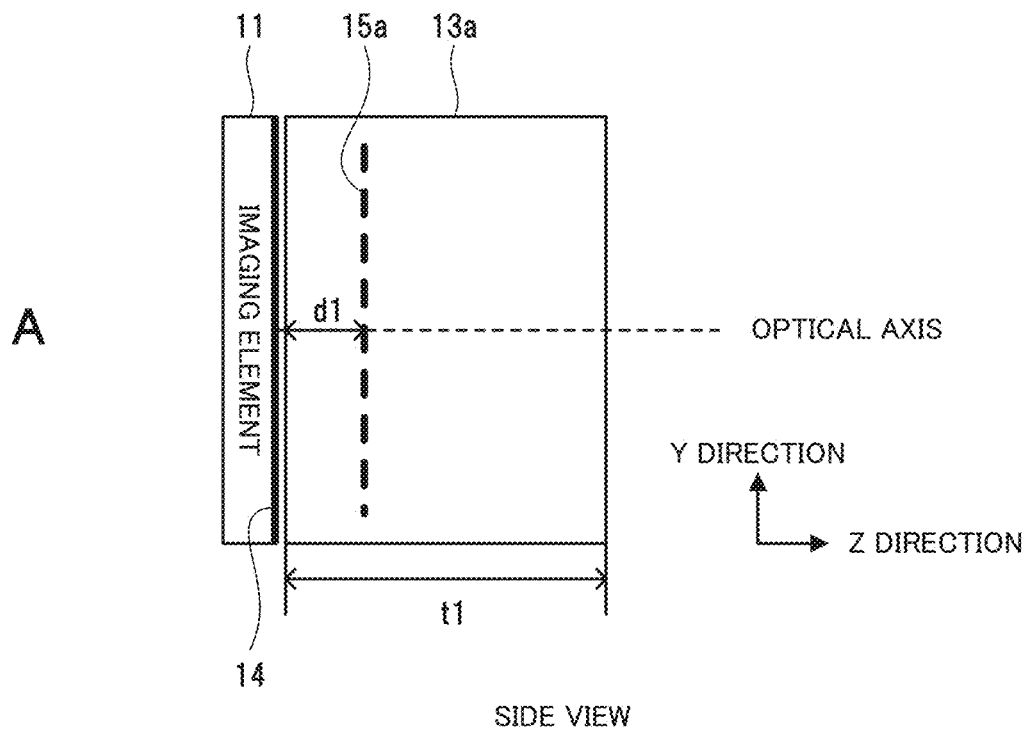
FIG. 4 is a diagram for illustrating an example of a prism of the first example embodiment.
Figure 4:
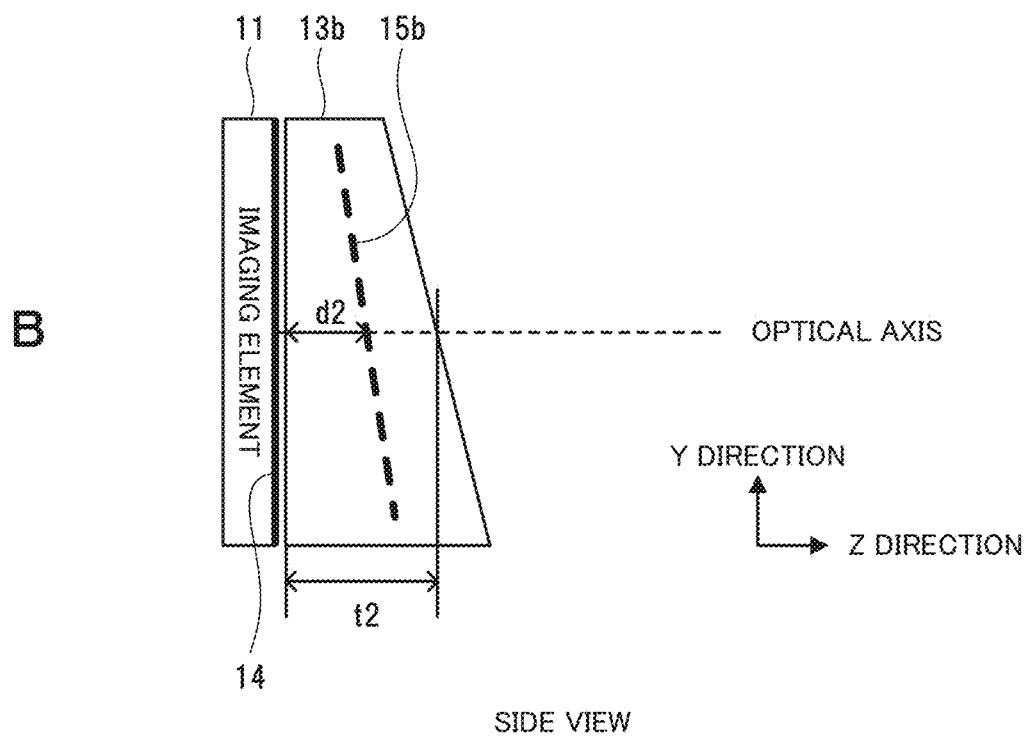

FIG. 4 is a diagram for illustrating an example of a prism of the first example embodiment. In FIG. 4A, a focusing surface (not shown) is in parallel with the light receiving surface 14. Accordingly, the virtual image 15*a* of the light receiving surface 14 is formed in parallel with the light receiving surface 14. As a result, the shape of the prism 13*a* is a cuboid.

Also, when the prism 13*a* has the shape as shown in FIG. 4A, the location where the virtual image 15*a* is formed can be represented using a thickness t1 and a refraction index n of the prism 13*a*.

Specifically, the location of the virtual image 15*a* can be represented by a distance d1 as shown in Expression 1. That is, the distance d1 is a distance from a surface of the prism 13*a* on the light receiving surface 14 side of the imaging element 11 to the virtual image 15*a* in the Z direction (the same direction as the optical axis).

$$d1 = t\left(1 - \frac{1}{n}\right) \qquad \text{[Expression 1]}$$

d1: the distance from the surface orthogonal of the prism (the light receiving surface of the image sensor)
t: the thickness of the prism
n: the refraction index of the prism Next, in FIG. 4B, a focusing surface (not shown) like the focusing surface 16 in FIG. 3 is inclined with respect to the light receiving surface 14. Accordingly, the virtual image 15*b* of the light receiving surface 14 is formed inclined with respect to the light receiving surface 14. For this reason, the prism 13*b* in FIG. 4B is formed in a wedge shape. The wedge shape is a shape in which one end has a large width and the width becomes smaller toward the other end.

For example, if the prism 13*b* has a shape as shown in FIG. 4B, the location where the virtual image 15*b* is formed can be represented using a thickness t2 and a refraction index n of the prism 13*b*. The thickness t2 corresponds to a distance in the Z direction from the surface on the light receiving surface 14 side of the prism 13*b*.

Specifically, the position of the virtual image 15*b* can be represented by the distance d1 (=d2) as shown in Expression 1. Note that in the case of FIG. 4B, the distance d2 is the distance in the Z direction from the surface on the light receiving surface 14 side of the prism 13*b*. As represented by Expression 1, the plane of the virtual image 15*b* is present at the position at which the ratio between the thickness t2 of the prism 13*b* and the distance d2 is kept.

The method for designing the prism will be described below.

Figure 5:
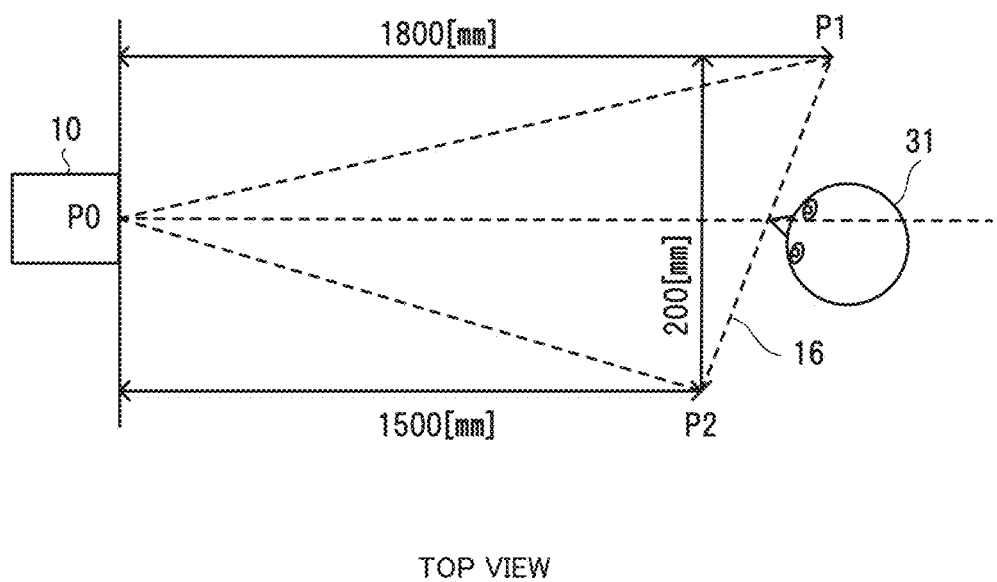
FIG. 5 is a diagram for illustrating the method for designing the prism.

FIG. 5 is a diagram for illustrating the method for designing the prism. FIG. 5 is a side view showing the relationship between the optical system 10 and the subject 31. In the example of FIG. 5, the focusing surface 16 is parallel with the face of the subject (imaged person) 31. Also, the length of the focusing surface 16 (from a point P1 to a point P2) is 200 mm. The object distance from a point P0 of the optical system 10 to the point P1 of the focusing surface 16 is 1800 mm, and the object distance from the point P0 of the optical system 10 to the point P2 on the focusing surface 16 is 1500 mm.

Figure 6:
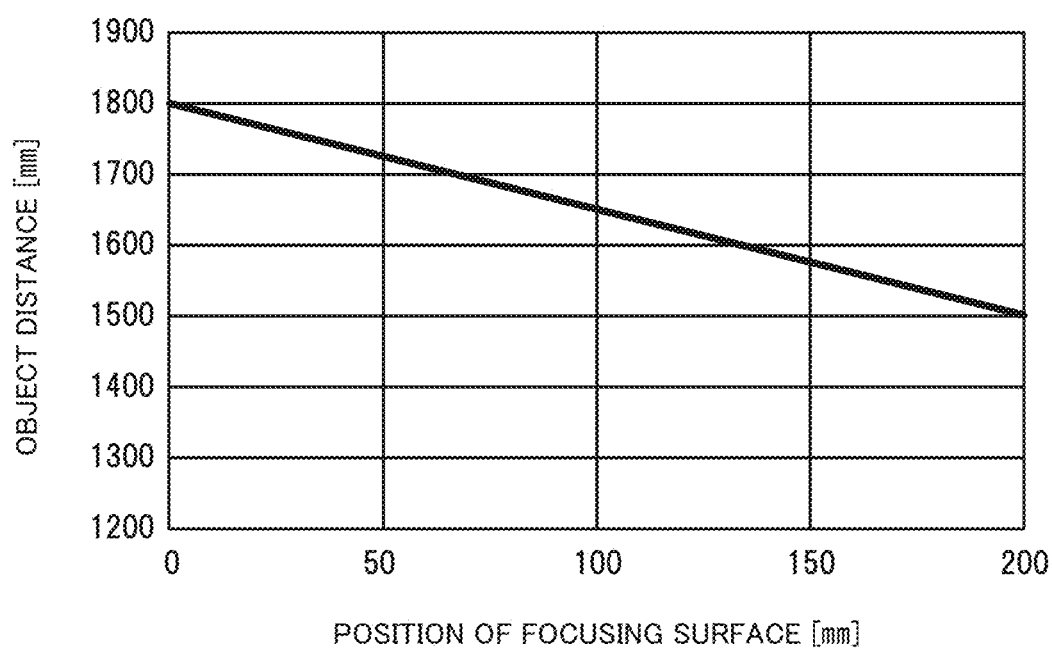
FIG. 6 is a diagram showing the relationship between the position of the focusing surface and the object distance.

FIG. 6 is a diagram showing the relationship between the position of the focusing surface and the object distance. FIG. 6 is a graph showing the relationship between the position of the focusing surface 16 of FIG. 5 and a focusing distance P0-P1 (point P0 to point P1) and an object distance P0-P2 (point P0 to point P2).

Figure 7:
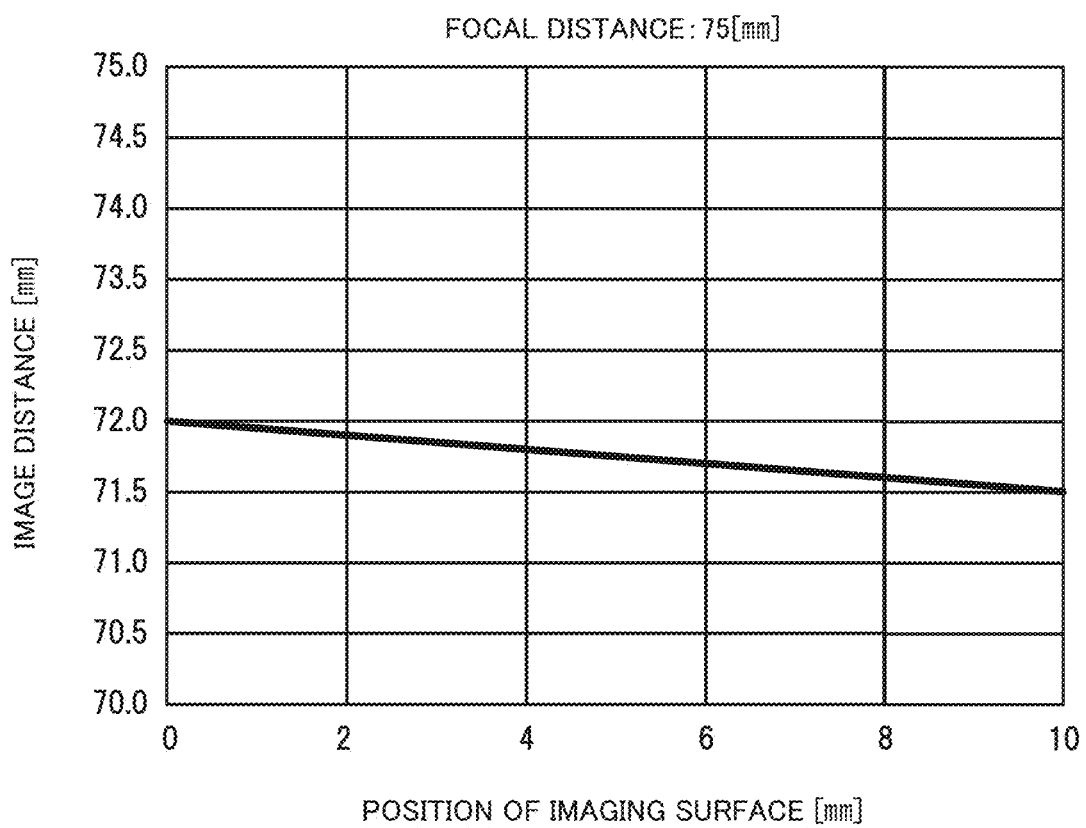
FIG. 7 is a diagram showing the relationship between the position of the image surface in an image forming relationship with the focusing surface and the image distance.

FIG. 7 is a diagram showing the relationship between the position of the image surface in an image forming relationship with the focusing surface and the image distance. FIG. 7 is a graph showing the relationship between the position of the image surface in an image forming relationship with the focusing surface 16 in FIG. 5 and the image distance, in the case where the focal distance of the lens is set to 75 mm.

Note that the image forming relationship can be represented by Expression 2 using the object distance s, the image distance s', and the focal distance f of the lens.

$$\frac{1}{s} + \frac{1}{s'} = \frac{1}{f} \qquad \text{[Expression 2]}$$

f: the focal distance of the lens
s: the object distance
s': the image distance

Figure 8:
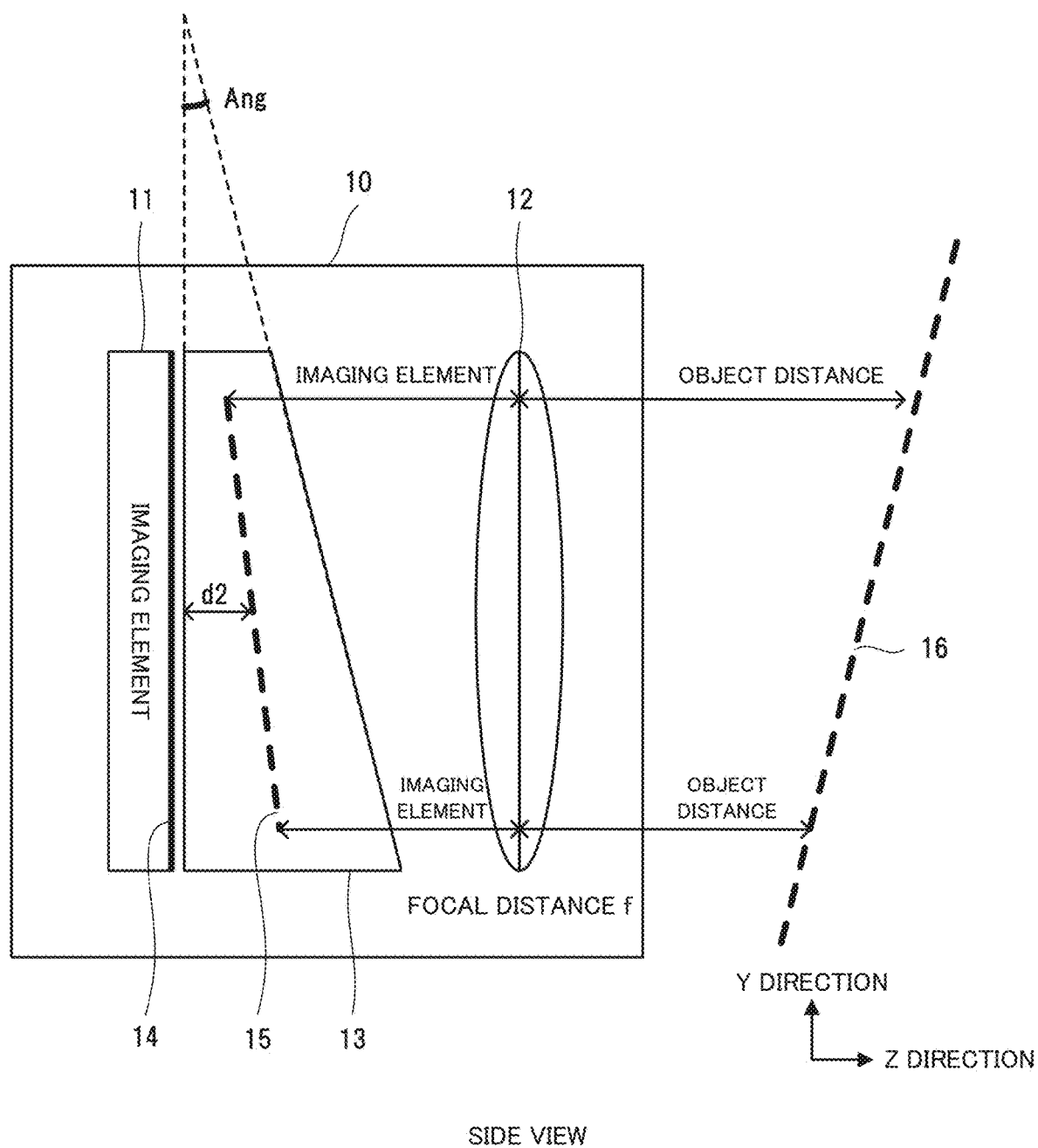
FIG. 8 is a diagram for illustrating a design method of the prism of the first example embodiment.

FIG. 8 is a diagram for illustrating a design method of the prism of the first example embodiment. In order to form the virtual image 15 of the imaging element 11 at the position having the image distance shown in the graph shown in FIG. 7 in the prism 13 of the optical system 10 shown in FIG. 8, the focal distance f of the lens 12 is set to 75 mm, the refraction index n of the prism 13 is set to 1.5, and an apex angle Ang of the prism 13 is set to 10°. In this manner, the prism 13 can be designed.

Note that, in this example, according to Expression 1, since the thickness t2 of the prism is three times the distance d2, the apex angle Ang of 10° can be obtained from the inverse function of three times the slope (tangent) of the image distance in the graph shown in FIG. 7. Generalizing this, the apex angle Ang can be obtained using Expression 3, where the position of the imaging surface in the Y direction is yi.

$$Ang = \tan^{-1}\left(\frac{t2}{y_i}\right) \qquad \text{[Expression 3]}$$

Ang: the apex angle
yi: the direction
t2: the thickness

Face authentication and iris authentication will be described below.

Figure 9:
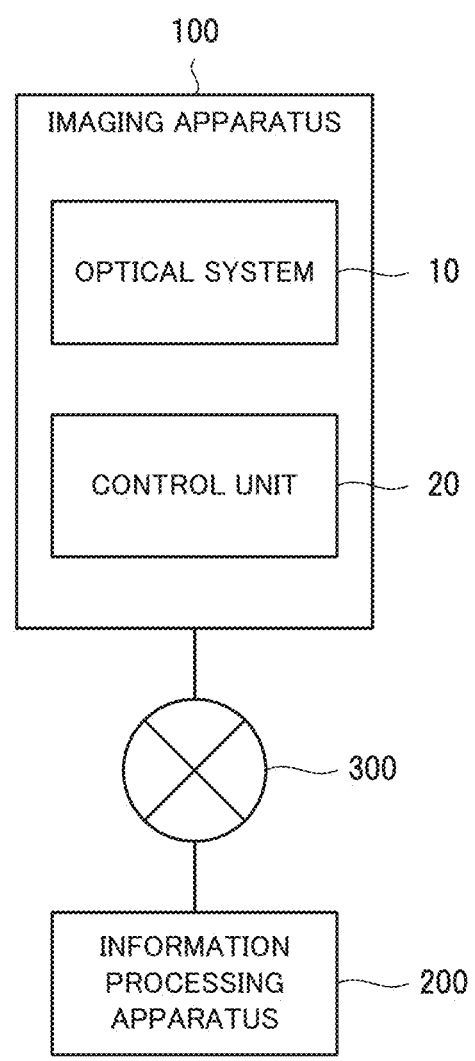
FIG. 9 is a diagram for illustrating an example of the system including the imaging apparatus of the first example embodiment.

FIG. 9 is a diagram for illustrating an example of the system including the imaging apparatus of the first example embodiment. The system shown in FIG. 9 is an apparatus used for object recognition such as face authentication and iris authentication. Also, the system shown in FIG. 9 includes an imaging apparatus 100, an information processing apparatus 200, and a network 300.

The imaging apparatus 100 includes the above-mentioned optical system 10 and the control unit 20. The imaging apparatus 100 is, for example, a camera.

The control unit 20 obtains imaging data (or an imaging signal) output from the imaging element 11 provided in the optical system 10, and transmits the obtained imaging data to the information processing apparatus 200 via the network 300. The control unit 20 is, for example, a programmable device such as a CPU (Central Processing Unit) or an FPGA (Field-Programmable Gate Array), a GPU (Graphics Processing Unit), or a circuit provided with one or more of those.

The information processing apparatus 200 executes face authentication processing, iris authentication processing, or both types of processing, based on the received imaging data. Note that the information processing apparatus 200 may execute object recognition processing other than face authentication processing and iris authentication processing. The information processing apparatus 200 is, for example, a programmable device such as a CPU or an FPGA, a GPU, or a circuit provided with one or more of the above devices, a server computer, a personal computer, a mobile terminal, or the like.

Note that, in the example of FIG. 9, a configuration is described in which the information processing apparatus 200 executes face authentication processing, iris authentication processing, or both types of processing, but the control unit 20 may execute the above processing.

The network 300 is, for example, a general network built using a communication line such as the Internet, a LAN (Local Area Network), a dedicated line, a telephone line, an in-house network, the mobile communication network, Bluetooth (registered trademark), Wi-Fi (Wireless Fidelity), or the like.

Figure 10:
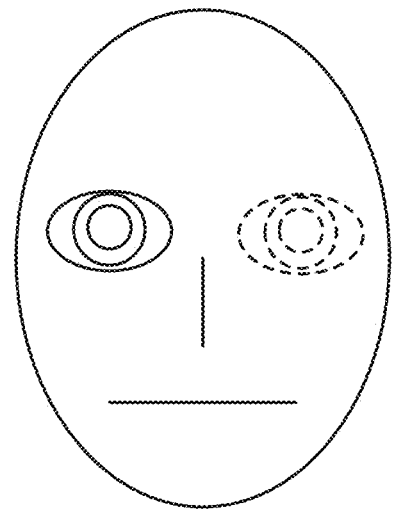
FIG. 10 is a diagram for illustrating face authentication and iris authentication.
Figure 10:
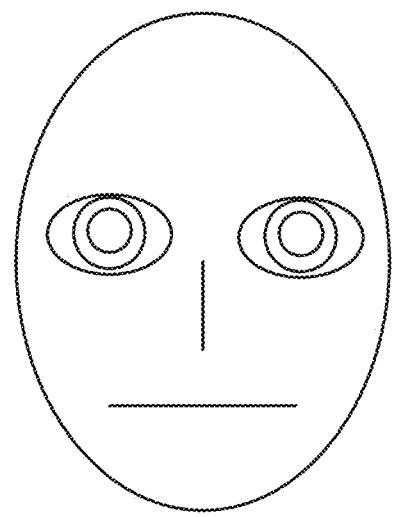
Figure 11:
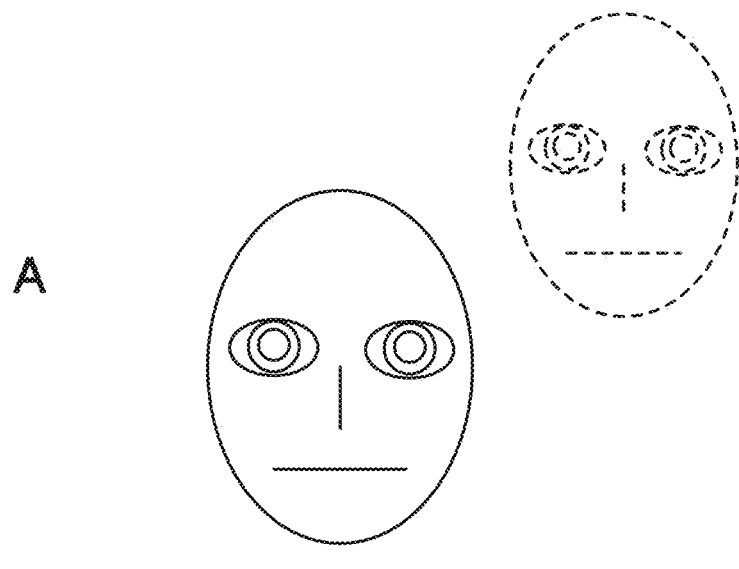
FIG. 11 is a diagram for illustrating face authentication and iris authentication.
Figure 11:
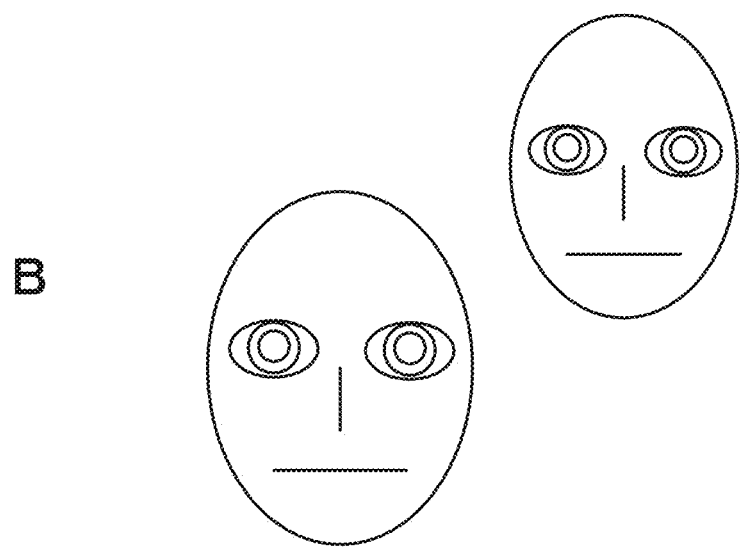

FIGS. 10 and 11 are diagrams for illustrating face authentication and iris authentication. As described above, in the conventional imaging apparatus, for example, when the face of the imaged person is inclined with respect to the imaging surface, the right eye portion (solid line) of the face can be focused on, but the left eye portion (dashed line) cannot be focused on, as shown in FIG. 10A. For this reason, it is not possible to perform accurate face authentication and iris authentication.

However, when the imaging apparatus including the optical system 10 of the first example embodiment is used, as shown in FIG. 10B, the right eye portion and the left eye portion can be focused on, and face authentication and iris authentication can be accurately performed.

Also, in the above conventional imaging apparatus, for example, if there are a plurality of imaged persons, of the two faces shown in FIG. 11A, only the face on the right (solid line) is focused on, but the face on the left (dashed line) cannot be focused on.

However, in the imaging apparatus including the optical system 10 of the first example embodiment, the faces of the two imaged persons can be focused on as shown in FIG. 11B, and thus face authentication and iris authentication are accurately performed on the faces of the imaged persons.

Figure 12:
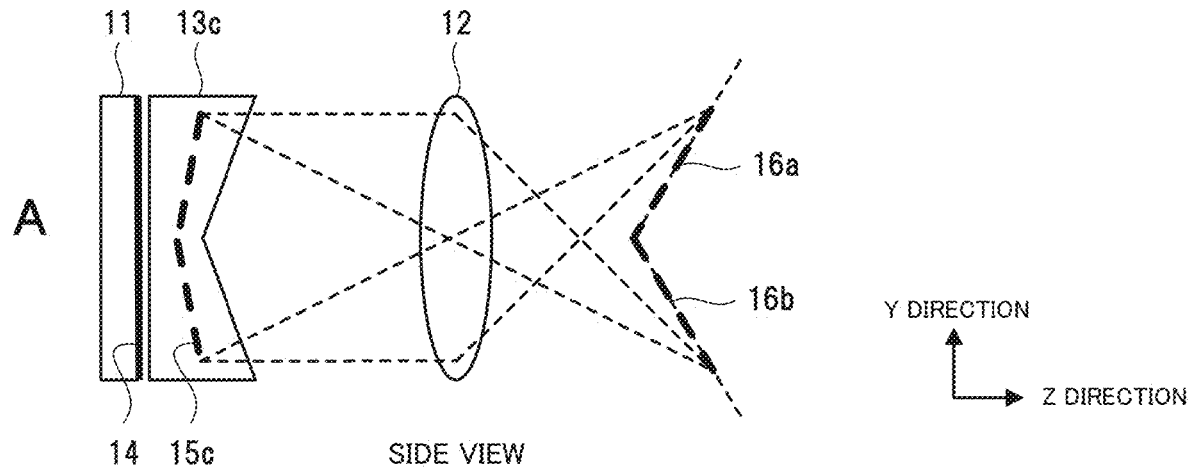
FIG. 12 is a diagram for illustrating an example of another prism of the first example embodiment.
Figure 12:
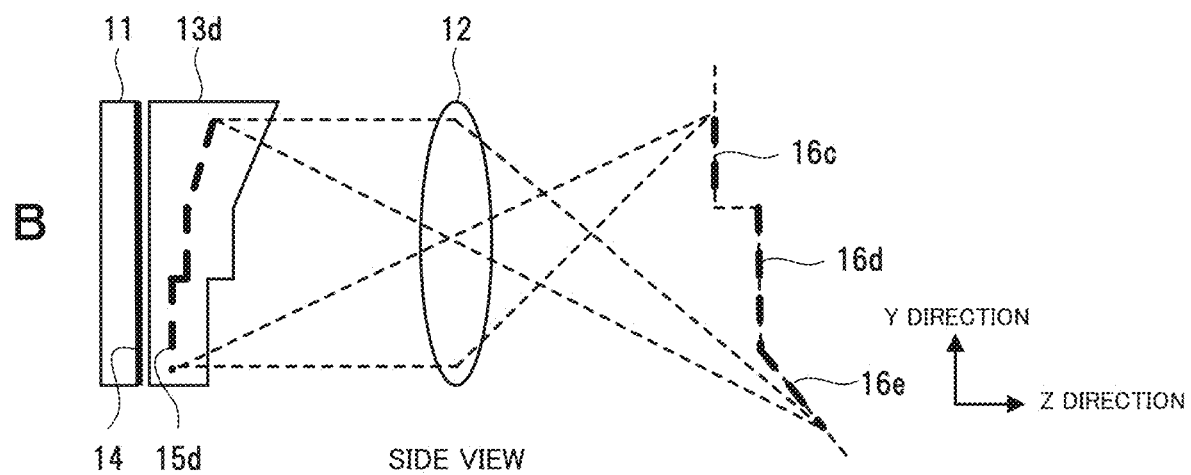
Figure 12:
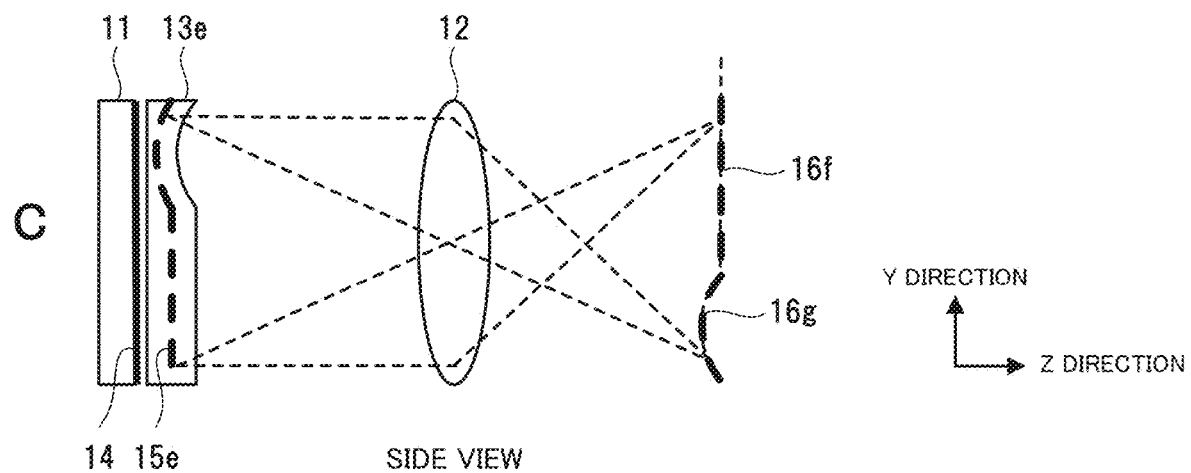

Other prisms will be described below:

FIG. 12 is a diagram for illustrating an example of another prism of the first example embodiment. FIGS. 12A, 12B, and 12C show optical systems including a plurality of focusing surfaces and a curved focusing surface.

The optical system in FIG. 12A includes two focusing surfaces 16a and 16b. In other words, the prism 13c as shown in FIG. 12A focuses the subject on the focusing surfaces 16a and 16b (L-shaped focusing surfaces) that are inclined with respect to the light receiving surface 14. For this reason, the shape of the prism 13c of FIG. 12A is designed such that the L-shaped virtual image 15c of the light receiving surface 14 of the imaging element 11 as shown in FIG. 12A is formed in the prism 13c that is in an image forming relationship with the L-shaped focusing surfaces 16a and 16b.

The optical system of FIG. 12B includes a plurality of discontinuous focusing surfaces 16c, 16d, and 16e. That is, the prism 13d shown in FIG. 12B focuses the subject on the focusing surface 16c that is parallel with the light receiving surface 14, the focusing surface 16d that has a depth different from that of the focusing surface 16c, and the focusing surface 16e that is inclined with respect to the light receiving surface 14. For this reason, the shape of the prism 13d in FIG. 12B is designed such that the virtual image 15d of the light receiving surface 14 of the imaging element 11 as shown in FIG. 12B is formed in the prism 13d that is in an image forming relationship with the focusing surfaces 16c, 16d, and 16e.

The optical system in FIG. 12C includes a plurality of focusing surfaces 16f and 16g. In other words, the prism 13e shown in FIG. 12C focuses the subject on the focusing surface 16f that is in parallel with the light receiving surface 14 and the focusing surface 16g that is curved. For this reason, the shape of the prism 13e of FIG. 12C is designed such that the virtual image 15e of the light receiving surface 14 of the imaging element 11 as shown in FIG. 12C is formed in the prism 13e that is in an image forming relationship with the focusing surfaces 16f and 16g.

[Effect of First Example Embodiment]

As described above, according to the first example embodiment, the prism is used such that the virtual image 15 of the light receiving surface 14 of the imaging element 11 is formed in the prism 13 that is in an image forming relationship with the focusing surface, and thus the optical system can be reduced in size.

Also, the shape of the prism 13 may be formed such that the surface that is in an image forming relationship with the focusing surface 16 is the virtual image, and thus the prism 13 can be designed using only the above-described Expressions 1 and 2. As such, the design is simple, which can further suppress the cost.

Also, since the optical system can be reduced in size, the imaging apparatus used for object recognition such as face authentication and iris authentication can be reduced in size. Note that the optical system can be applied to an imaging apparatus used for a purpose other than object recognition such as face authentication and iris authentication. Further, it is also possible that a plurality of prisms having different shapes for each purpose are prepared in advance, and the prism may be replaced and used in accordance with the positional relationship between the optical system and the subject.

Further, since the optical system can be reduced in size, the projection apparatus for projecting and displaying an image on a projecting surface can be reduced in size. Further, it is also possible that a plurality of prisms having different shapes for each purpose are prepared in advance, and the prism may be replaced and used in accordance with the positional relationship between the optical system and the projecting surface.

Second Example Embodiment

Figure 13:
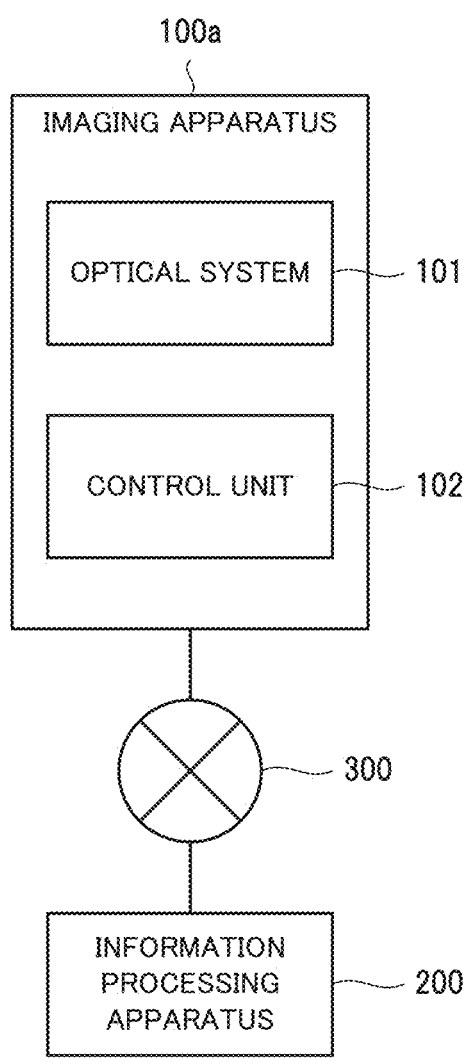
FIG. 13 is a diagram for illustrating an example of the system including the imaging apparatus of the second example embodiment.

A second example embodiment will be described using FIG. 13. The difference between the first example embodiment and the second example embodiment is the prism. FIG. 13 is a diagram for illustrating an example of the system including the imaging apparatus of the second example embodiment.

[Apparatus Configuration]

A system shown in FIG. 13 includes an imaging apparatus 100a, the information processing apparatus 200, and the network 300. Note that since the information processing apparatus 200 and the network 300 have been described in the first example embodiment, description thereof will be omitted.

The imaging apparatus 100a includes an optical system 101 and a control unit 102. The imaging apparatus 100a is, for example, a camera.

The optical system 101 has the same configuration as that of the first example embodiment, but the prism portion included in the optical system 101 of the second example embodiment can be changed in shape. The optical system 101 will be described in detail later.

The control unit 102 has the same configuration as that of the first example embodiment. In addition, the control unit 102 of the second example embodiment performs control for changing the shape of the prism. The control unit 102 will be described in detail later.

The optical system of the second example embodiment will be described below.

Figure 14:
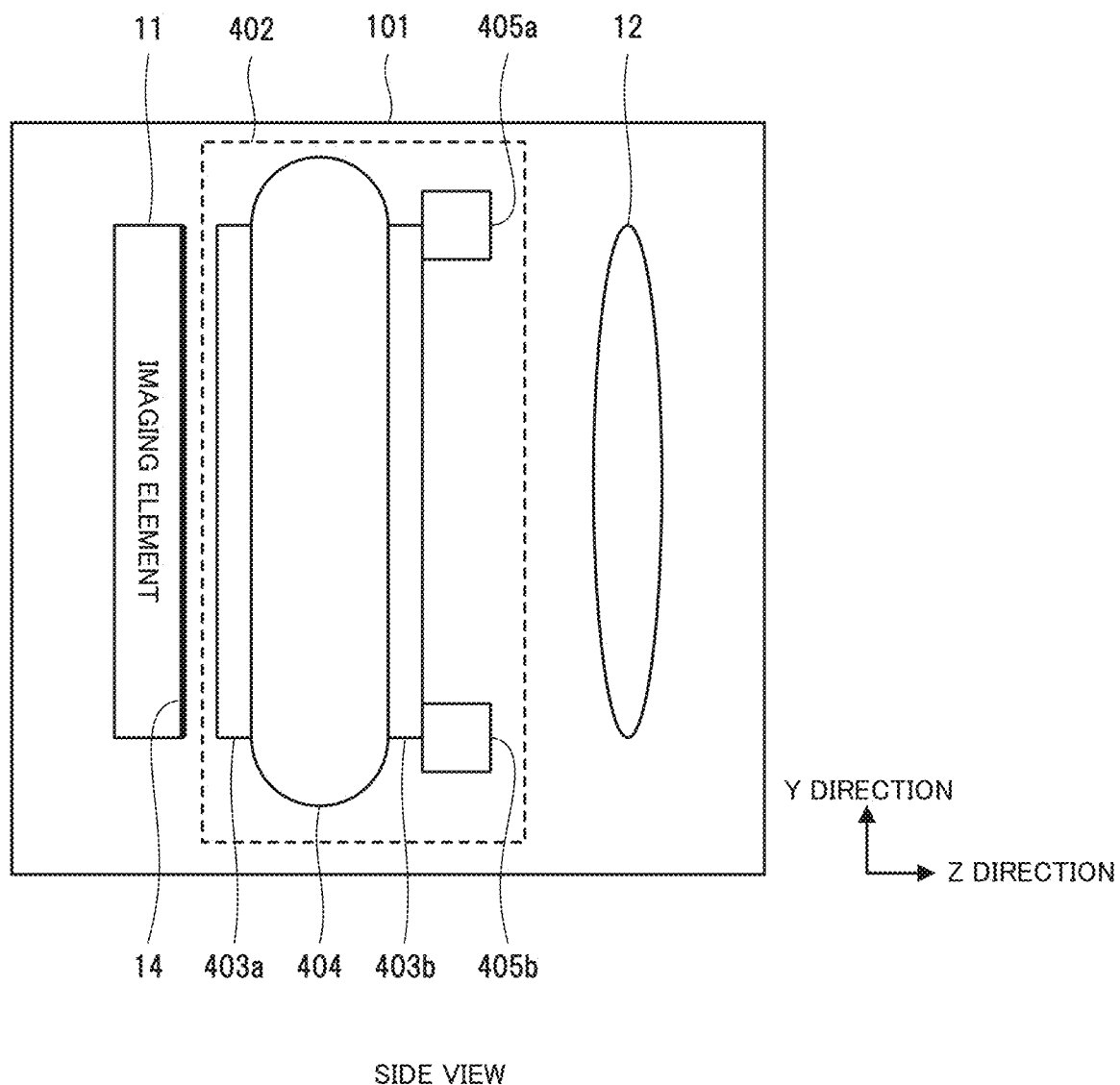
FIG. 14 is a diagram for illustrating the optical system of the second example embodiment.

FIG. 14 is a diagram for illustrating the optical system of the second example embodiment. The optical system 101 includes the imaging element 11, the lens 12, and a prism portion 402. Since the imaging element 11 and the lens 12 have been described in the first example embodiment, the description thereof will be omitted.

The prism portion 402 includes a plate portion 403a, a plate portion 403b, a stretchable portion 404, an actuator 405a, and an actuator 405b. The position of the focusing surface of the prism portion 402 can be changed by changing the shape.

The plate portion 403a is provided on the imaging element 11 side of the stretchable portion 404 (on the opposite side to the Z direction) in parallel with the light receiving surface 14 and fixed. A surface of the plate portion 403a on the lens 12 side (Z direction side) is attached to a portion on the image device 11 side (the opposite side to the Z direction) of the stretchable portion 404.

The plate portion 403b is provided on the lens 12 side (Z direction side) of the stretchable portion 404. Also, the surface on the imaging element 11 side (the opposite side to the Z direction) of the plate portion 403b is adhered to the lens 12 side (Z direction side) of the stretchable portion 404.

The material for the plate portions 403a and 403b is, for example, glass or plastic. Note that the material for the plate portions 403a and 403b is not limited to glass and plastic, and may be any transparent material having the same effects as that of glass and plastic.

The stretchable portion 404 is provided between the plate portion 403a and the plate portion 403b, and adhered to the plate portion 403a and the plate portion 403b at predetermined positions. In the stretchable portion 404, a liquid fills a transparent medium (stretchable material) formed in a stretchable bag shape.

The stretchable material is, for example, silicone rubber. Note that the stretchable material is not limited to silicone rubber, and may be any stretchable material that has the same effects as silicone rubber and the like.

The liquid is, for example, water or oil. Note that the liquid is not limited to water or oil, and may be any liquid that has the same effects as water and oil.

Also, the stretchable portion 404 has a refraction index. The refraction indices of the plate portion 403a, the plate portion 403b, and the stretchable portion 404 may be the same or different from each other.

The actuator 405a is provided at one end (predetermined position) on the lens 12 side (z direction side) of the plate portion 403b. Also, the actuator 405a is driven by control of the control unit 102, and moves the one end on the lens 12 side (z direction side) of the flat portion 403b in the Z direction or the direction opposite to the Z direction. Note that the position of the actuator 405a is not limited to the position shown in FIG. 14.

The actuator 405b is provided at the other end (predetermined position) on the lens 12 side (Z direction side) of the plate portion 403b. Also, the actuator 405b is driven by control of the control unit 102, and moves the other end of the plate portion 403b on the lens 12 side (Z direction side) in the Z direction or the direction opposite to the Z direction. Note that the position of the actuator 405b is not limited to the position shown in FIG. 14.

Figure 15:
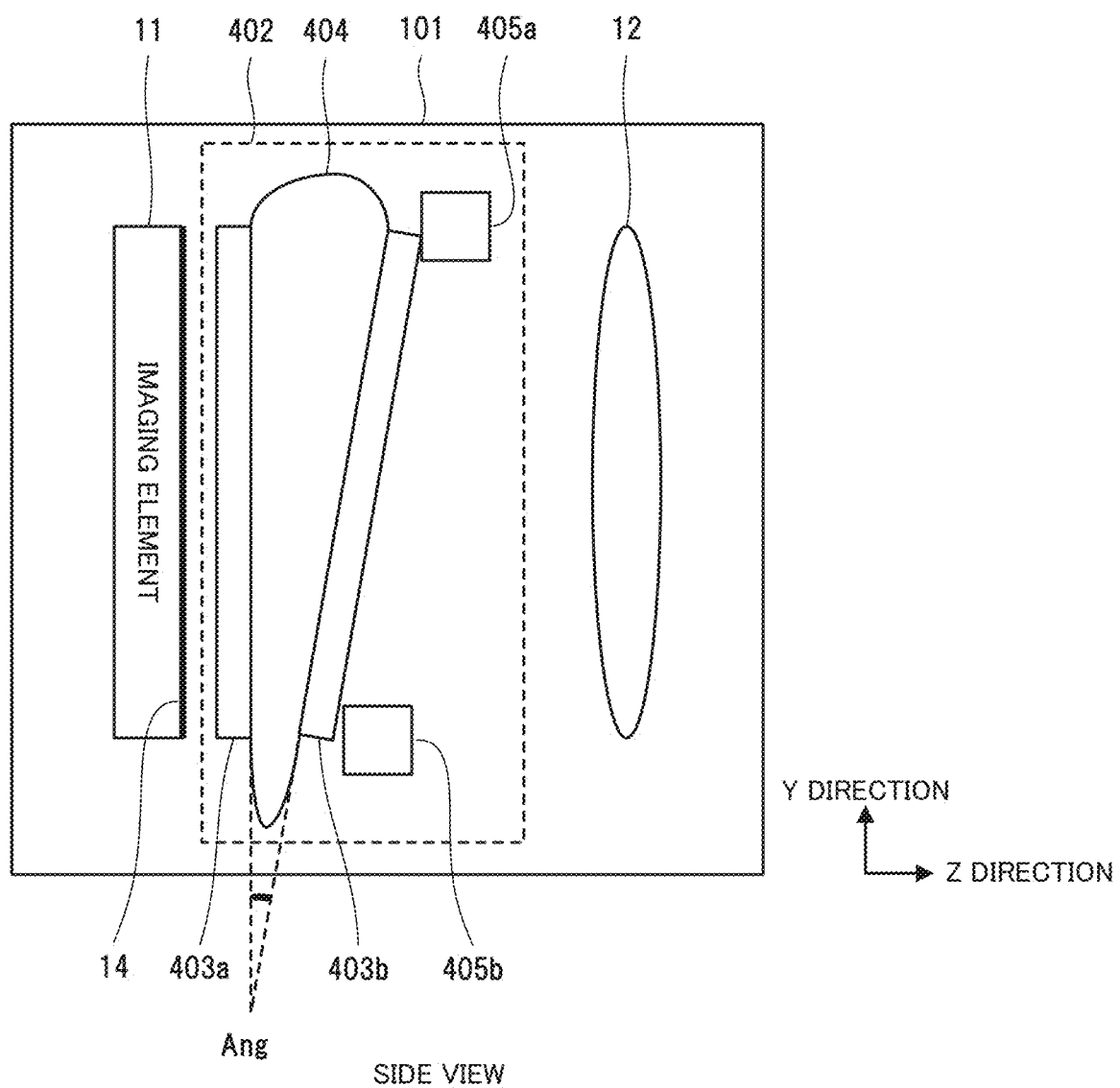
FIG. 15 is a diagram for illustrating an optical system according to the second example embodiment.

In the second example embodiment, by controlling the actuators 405a and 405b, the plate portion 403b is tilted to deform the stretchable portion 404. For example, the stretchable portion 404 is deformed to the shape as shown in FIG. 15. FIG. 15 is a diagram for illustrating an optical system according to the second example embodiment.

In the example shown in FIG. 15, using the actuator 405b, the other end of the plate portion 403b is pressed and tilted in the direction opposite to the Z direction, and deforms the stretchable portion 404 into a wedge shape.

Specifically, the control unit 102 controls the actuators 405a and 405b to tilt the surface of the plate portion 403b, based on the predetermined condition. The condition is that, in the case of FIG. 15, the angle formed by the plate portion 403a and the plate portion 403b is the predetermined apex angle Ang.

Also, the stretchable portion 404 may be deformed in accordance with the installation condition of the imaging apparatus 100a. Further, the focusing state of the subject may be detected through the image processing, and the stretchable portion 404 may be dynamically deformed in accordance with the detected focusing state.

Note that although the stretchable portion 404 is deformed by controlling the actuators 405a and 405b in the second example embodiment, the plate portions 403a and 403b may be manually moved using threads or the like instead of the actuators 405a and 405b.

[Effects of Second Example Embodiment]

As described above, according to the second example embodiment, in addition to achieving the effects of the first example embodiment, the stretchable portion 404 can be automatically deformed.

Third Example Embodiment

Figure 16:
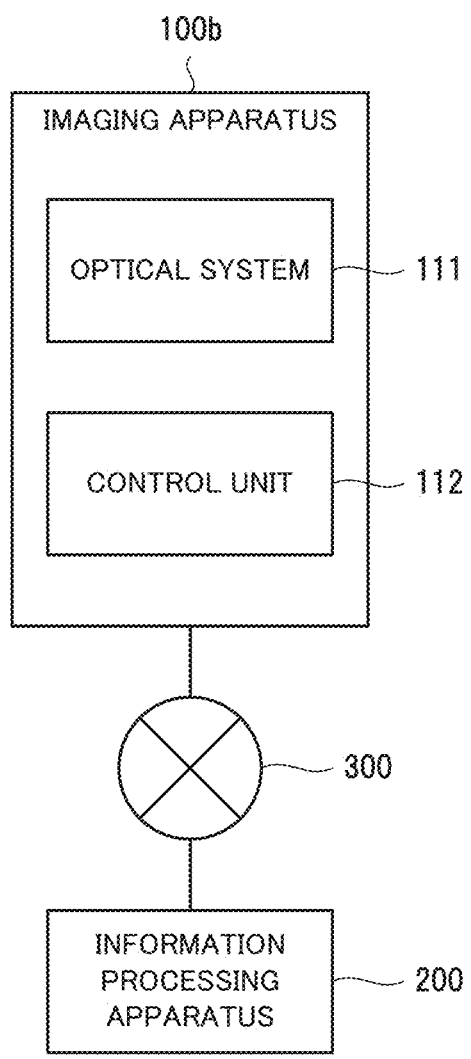
FIG. 16 is a diagram for illustrating one example of the system including the imaging apparatus according to the third example embodiment.

A third example embodiment will be described below using FIG. 16. The difference between the first example embodiment and the third example embodiment is the prism. FIG. 16 is a diagram for illustrating one example of the system including the imaging apparatus according to the third example embodiment.

[Apparatus Configuration]

A system shown in FIG. 16 includes an imaging apparatus 100b, the information processing apparatus 200, and the network 300. Note that since the information processing apparatus 200 and the network 300 have been described in the first example embodiment, description thereof will be omitted.

The imaging apparatus 100b includes an optical system 111, and a control unit 112. The imaging apparatus 100b is, for example, a camera.

The optical system 111 has the same configuration as the first example embodiment, but the position of the focusing surface can be changed by rotating the prism included in the optical system 111 of the third example embodiment. The detail of the optical system 111 will be described later.

The control unit 112 has the same configuration as the first example embodiment. Note that the control unit 112 of the third example embodiment further performs control for rotating the prism. The detail of the control unit 112 will be described later.

The optical system of the third example embodiment will be described below.

Figure 17:
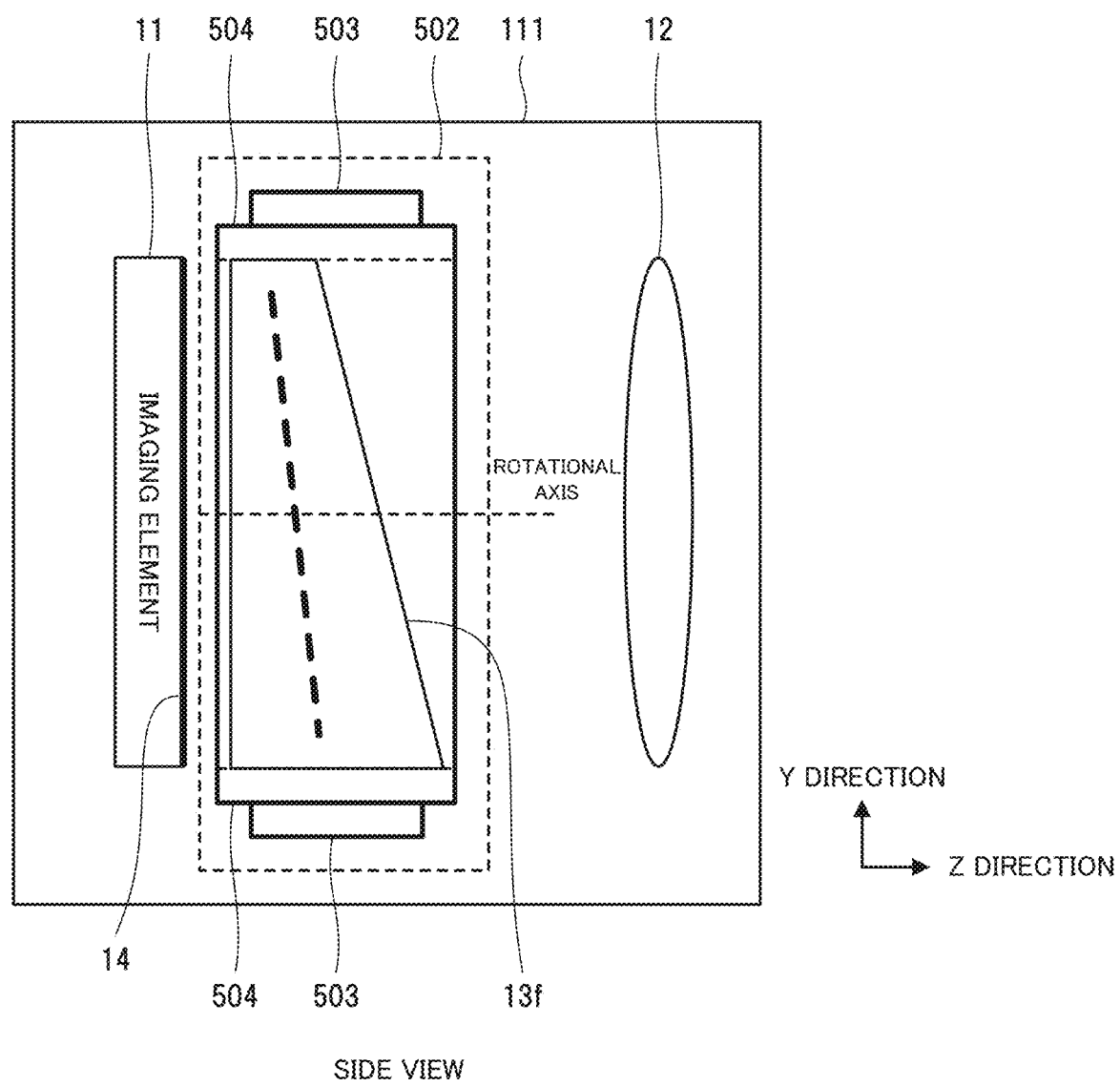
FIG. 17 is a diagram for illustrating the optical system of the third example embodiment.

FIG. 17 is a diagram for illustrating the optical system of the third example embodiment. The optical system 111 includes the imaging element 11, the lens 12, and a prism portion 502. Note that since the imaging element 11 and the lens 12 have been described in the first example embodiment, description thereof will be omitted.

The prism portion 502 includes a hollow shaft motor 503 and a prism 13f. The prism portion 502 can change the position of the focusing surface by rotating the prism 13f using the hollow shaft motor 503.

The hollow shaft motor 503 rotates the prism 13f by the control unit 112 controlling a cylindrical rotation hollow shaft 504 to rotate about a rotational axis of the rotation hollow shaft 504.

Figure 18:
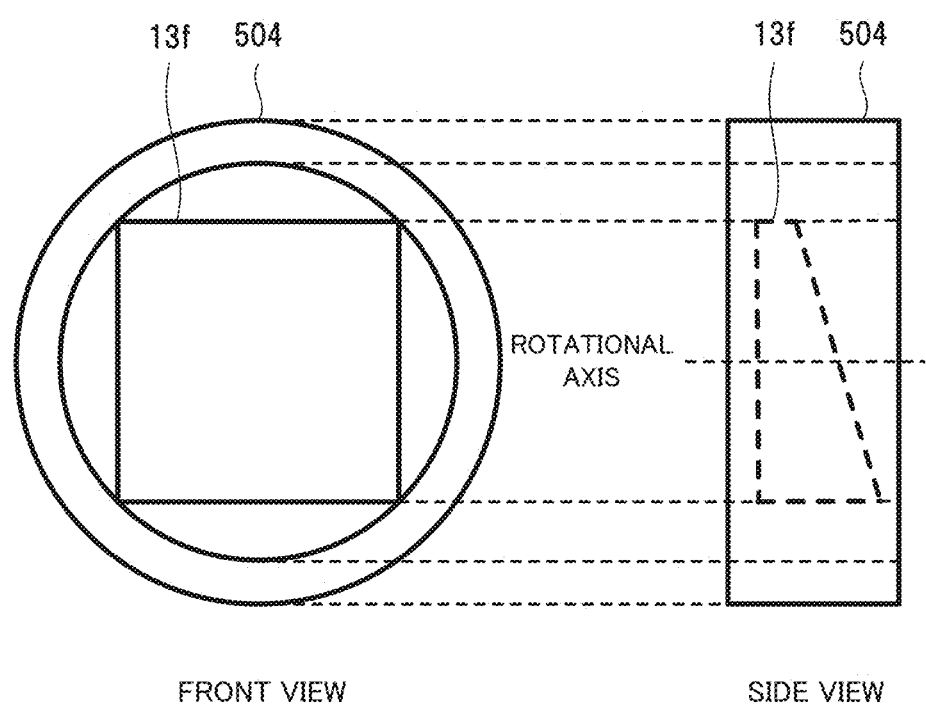
FIG. 18 is a diagram for illustrating one example of the structure of the rotation hollow shaft.

In the rotation hollow shaft 504, the prism 13f is attached inside the hollow portion as shown in FIG. 18. FIG. 18 is a diagram for illustrating one example of the structure of the rotation hollow shaft.

For example, by setting the rotation speed of the rotation hollow shaft 504 to 60 rps (3600 rpm), and the frame rate of the imaging element 11 to 600 fps, 10 images of the different focusing surfaces can be obtained every 1/60 second.

Note that the rotational axis shown in FIGS. 17 and 18 may match or be different from the optical axis of the lens 12.

Figure 19:
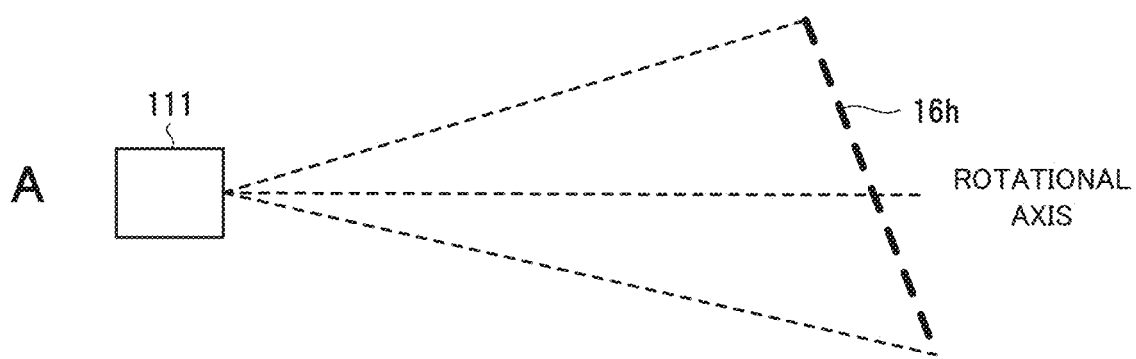
FIG. 19 is a diagram for illustrating the focusing surface of the third example embodiment.
Figure 19:
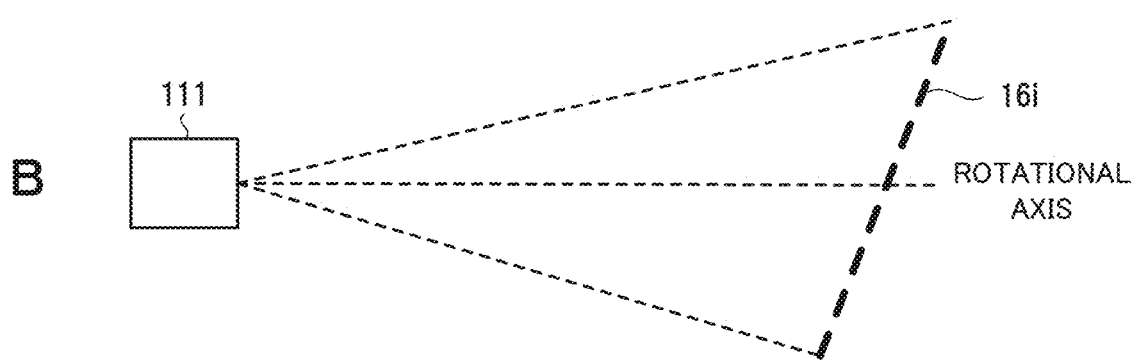

FIG. 19 is a diagram for illustrating the focusing surface of the third example embodiment. As shown in FIG. 19, the focusing surface moves (changes) over time according to the rotation of the prism 13f. A focusing surface 16h shown in FIG. 19A moves to a focusing surface 16i shown in FIG. 19B after a predetermined time has elapsed.

[Effects of Third Example Embodiment]

As described above, according to the third example embodiment, in addition to achieving the effects of the first example embodiment, focusing can be automatically performed on multiple locations.

When face authentication and iris authentication were actually performed using the imaging apparatus including the optical system 111 of the third example embodiment, an image in which the face of the imaged person and the left eye and the right eye of the imaged person were in focus was included in the 10 images. In other words, since an image in which the left eye and the right eye of the observed person are in focus can be obtained, accurate face authentication and iris authentication were performed.

Note that in the third example embodiment, the prism 13f may be subjected to rotation or parallel movement according to the installation condition of the imaging apparatus 100b. Further, the focusing state of the subject may be detected through image processing, and the prism 13f may be dynamically subjected to rotation or parallel movement according to the detected state. The prism 13f may also be subjected to parallel movement or parallel reciprocation, in addition to rotation.

Fourth Example Embodiment

Figure 20:
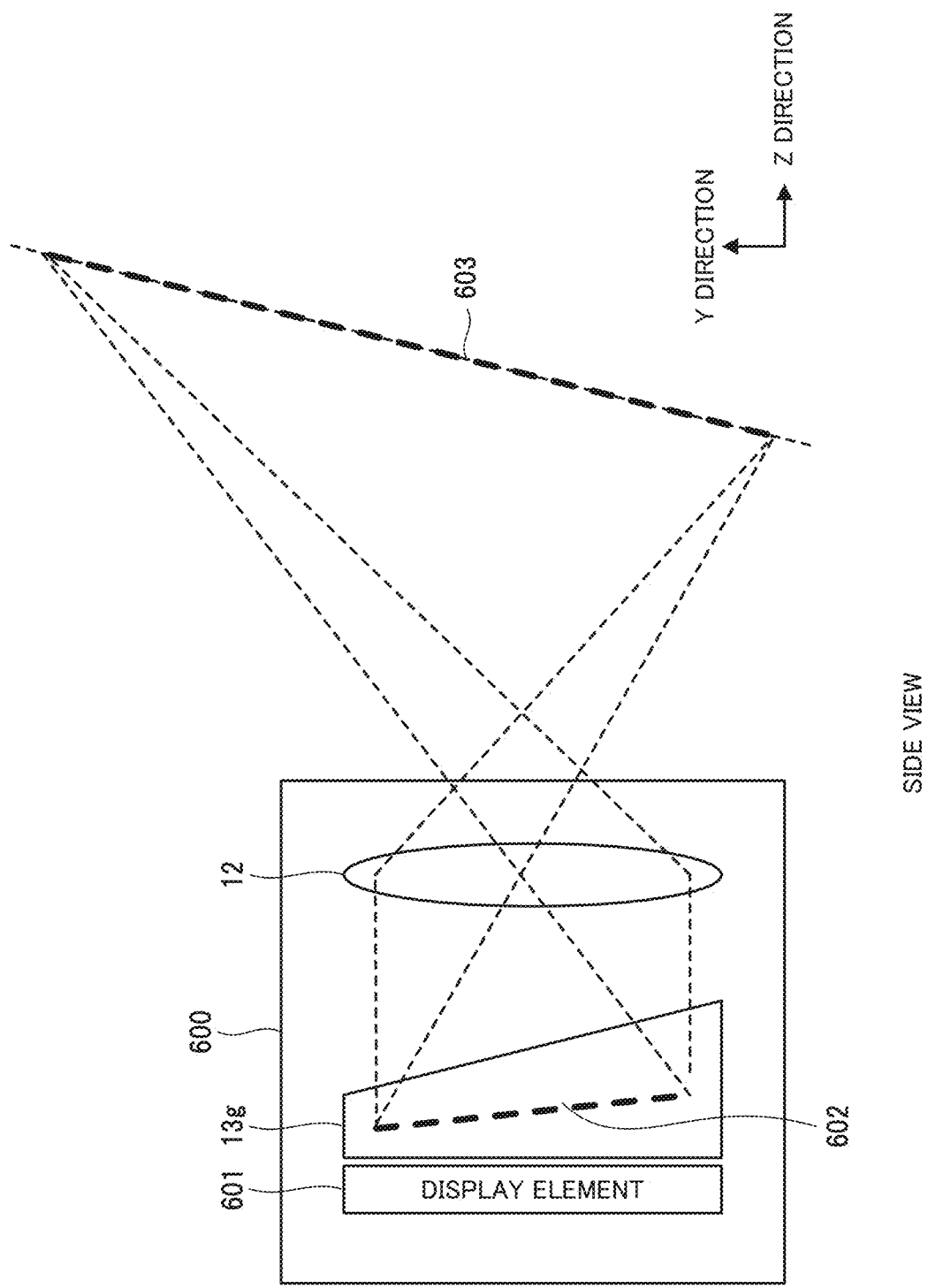
FIG. 20 is a diagram for illustrating an example of an optical system included in a projection apparatus.

A fourth example embodiment will be described using FIG. 20. FIG. 20 is a diagram for illustrating an example of an optical system included in a projection apparatus.

[Apparatus Configuration]

The optical system 600 shown in FIG. 20 is capable of focusing on multiple locations. Also, as shown in FIG. 20, the optical system 600 includes a display element 601, the lens 12, and a prism 13g.

The display element 601 is a device for displaying images. The display element 601 is, for example, various spatial light modulators such as a liquid crystal panel and a DMD. Note that the display element 601 is not limited to the above-described liquid crystal panel and a DMD.

Note that, regarding the resolution of the display element 601, it is conceivable to use a liquid crystal panel having horizontal 1920 pixels×vertical 1080 pixels, a pixel pitch of 10 μm, and a frame rate of 60 fps. However, the display element 601 is not limited to the above resolution, pixel pitch, and frame rate.

Note that since the lens 12 and the prism 13g have been described in the first example embodiment, description thereof will be omitted.

In the example of FIG. 20, the prism 13g is disposed in the optical path between the display element 601 and the lens 12. A virtual image 602 of the surface of the display element 601 is formed in the prism 13g. A projected surface 603 is at a position conjugate with the virtual image 602 via the lens 12 in the optical system 600. In other words, the projected surface 603 and the virtual image 602 are in an image forming relationship.

Since the projected object is focused on the projected surface 603, the shape of the prism 13g is formed such that the virtual image 602 of the surface of the display element 601 is formed in the prism 13g that is in an image forming relationship with the projected surface 603.

Other prisms will be described.

Figure 21:
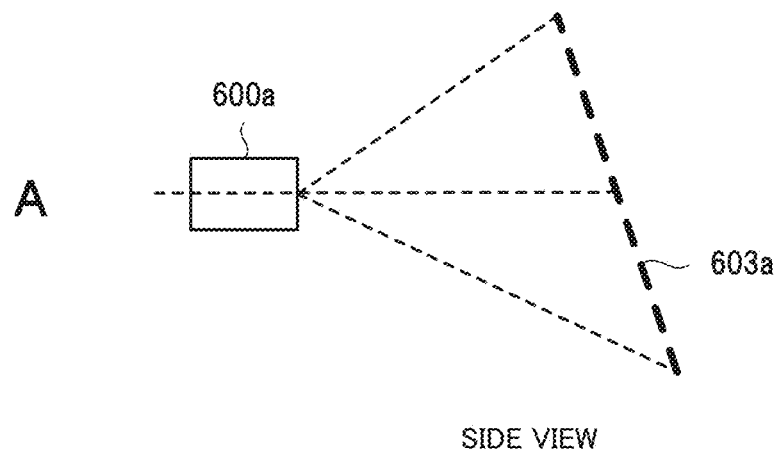
FIG. 21 is diagrams for illustrating examples of other prisms of the fourth example embodiment.
Figure 21:
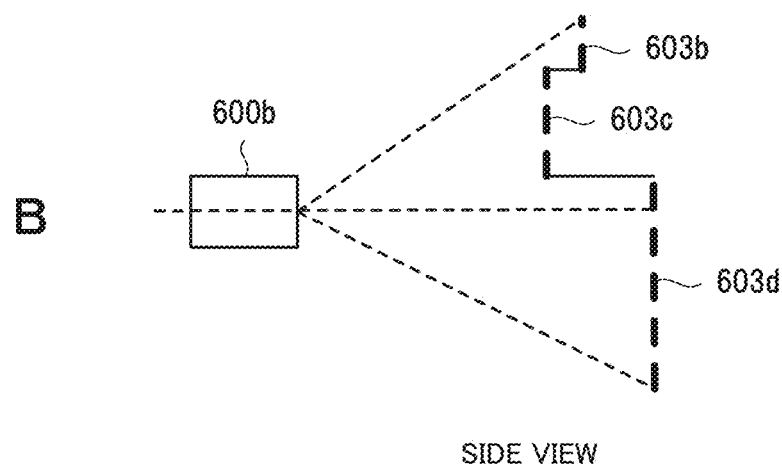
Figure 21:
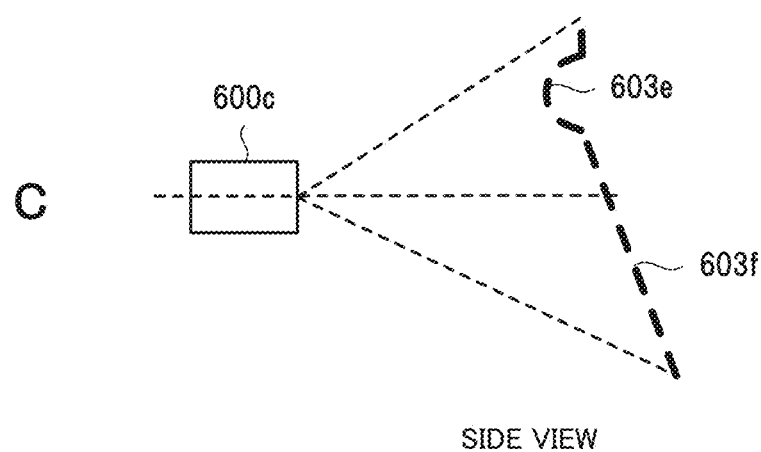
Figure 22:
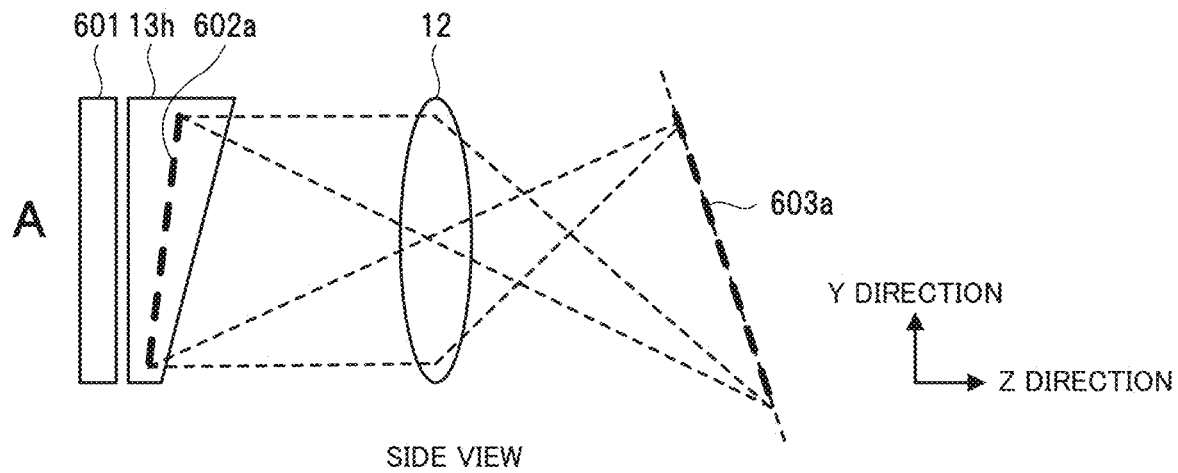
FIG. 22 is diagrams for illustrating examples of other prisms of the fourth example embodiment.
Figure 22:
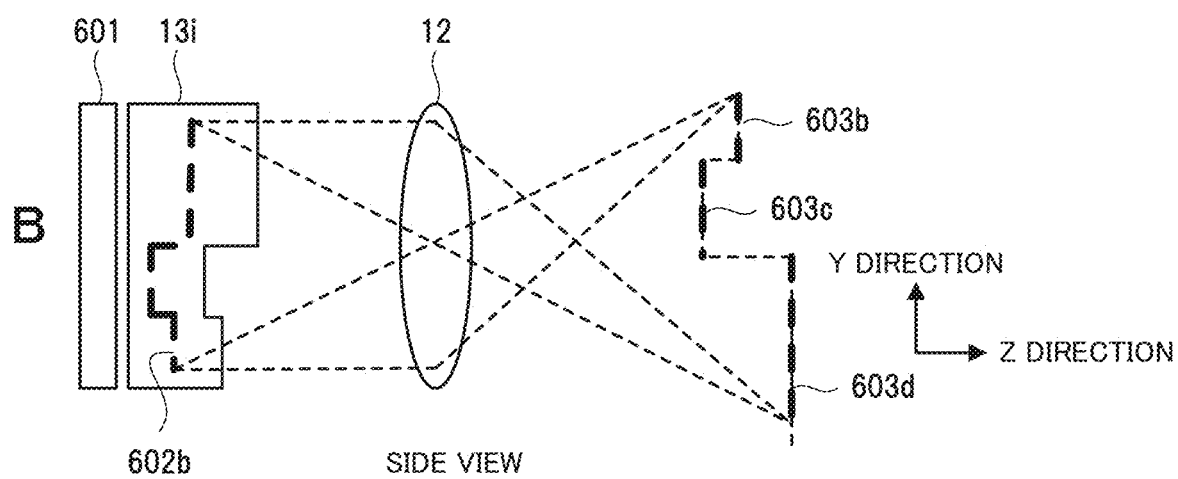
Figure 22:
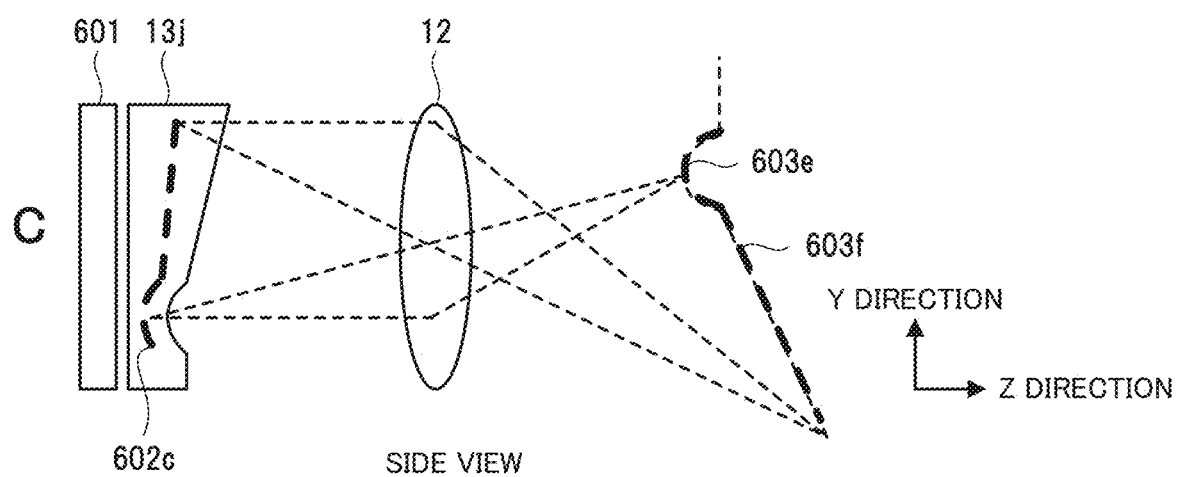

FIGS. 21 and 22 are diagrams for illustrating examples of other prisms of the fourth example embodiment. As shown in FIG. 21A, when the projected surface 603a is inclined with respect to the optical system 600a provided in the projection apparatus, a wedge-like prism 13h as shown in FIG. 22A is used.

In other words, the prism 13h as shown in FIG. 22A focuses the display element 601 that is a projected object on the projected surface 603a. For this reason, the shape of the prism 13h in FIG. 22A is designed such that a virtual image 602a of the display element 601 as shown in FIG. 22A is formed in the prism 13h that is in an image forming relationship with the projected surface 603a.

As shown in FIG. 21B, the projected surface on which the optical system 600b provided in the projection apparatus performs projection is formed by discontinuous projected surfaces 603b, 603c, and 603d having different depths, and thus a prism 13i including discontinuous surfaces as shown in FIG. 22B is used.

In other words, the prism 13i as shown in FIG. 22B focuses the display element 601 that is the projected object on the projected surfaces 603b, 603c, and 603d. For this reason, the shape of the prism 13i of FIG. 22B is designed such that the virtual image 602b of the display element 601 as shown in FIG. 22B is formed in the prism 13i that is in an image forming relationship with the projected surfaces 603b, 603c, and 603d.

As shown in FIG. 21C, the projected surface on which the optical system 600c provided in the projection apparatus performs projection is formed by a curved projected surface 603e and a projected surface 603f, and thus a prism 13j having a curved surface as shown in FIG. 22C is used.

In other words, the prism 13j as shown in FIG. 22C focuses the display element 601 that is the projected object on the projected surfaces 603e and 603f. For this reason, the shape of the prism 13j of FIG. 22C is designed such that the virtual image 602c of the display element 601 as shown in FIG. 22C is formed in the prism 13j that is in an image forming relationship with the projected surfaces 603e and 603f.

Note that in the projection apparatus according to the fourth example embodiment, when the prisms 13 corresponding to the projected surfaces including an inclined projected surface, discontinuous projected surfaces, and a projected surface including a curved surface were disposed on the display surface of the display element and image projection was performed, focused vivid images were observed on all the projected surfaces.

Also, when three display elements, namely red, green, and blue display elements, are used, prisms corresponding to the respective liquid crystals are arranged.

Further, the optical system of the second and third example embodiments may be used for the optical system 600 of the fourth example embodiment.

[Effects of Fourth Example Embodiment]

As described above, according to the fourth example embodiment, a prism capable of forming the virtual image 602 of the display element 601 can be formed in the prism 13 that is in an image forming relationship with the projected surface, the optical system can thus be reduced in size.

Also, the shape of the prism 13 may be formed such that the surface that is in an image forming relationship with the projected surface 603 is the virtual image, the prism 13 can be designed using only the above-described Expressions 1 and 2. Accordingly, the design is simple and costs can be further suppressed.

Further, since the optical system can be reduced in size, the projection apparatus that projects and displays an image on a projecting surface can be reduced in size. Further, it is also possible that a plurality of prisms having different shapes for each purpose are prepared in advance, and the prism may be replaced to be used in accordance with the positional relationship between the optical system and the projecting surface.

SUPPLEMENTARY NOTES

Furthermore, the following supplementary notes are disclosed regarding the example embodiments described above. Some portion or all of the example embodiments described above can be realized according to (supplementary note 1) to (supplementary note 12) described below, but the below description does not limit.

(Supplementary Note 1)
An optical system comprising:
an imaging element configured to convert light into an electric signal;
a lens configured to deflect and converge the light; and
a prism disposed in an optical path between the imaging element and the lens,
wherein a virtual image of a light receiving surface of the imaging element is formed in the prism and a focusing surface is at a position conjugate with the virtual image with the lens interposed therebetween.

(Supplementary Note 2)
The optical system according to Supplementary Note 1, wherein the prism includes:
a transparent first plate portion fixed on the imaging element side;
a transparent second plate portion disposed on the lens side;
a stretchable portion disposed between the first plate portion and the second plate portion, and in which a transparent stretchable bag-like medium is filled with a liquid; and
an actuator configured to tilt the second plate portion and change the shape of the stretchable portion.

(Supplementary Note 3)
The optical system according to Supplementary Note 1, further comprising
a hollow shaft motor configured to rotate a cylindrical rotation hollow shaft;
wherein the hollow shaft motor is configured to rotate the prism inside the rotation hollow shaft.

(Supplementary Note 4)
An imaging apparatus comprising:
an imaging element configured to convert light into an electric signal;
a lens configured to deflect and converge the light; and
a prism disposed in an optical path between the imaging element and the lens,
wherein a virtual image of a light receiving surface of the imaging element is formed in the prism and a focusing surface is at a position conjugate with the virtual image with the lens interposed therebetween.

(Supplementary Note 5)
The imaging apparatus according to Supplementary Note 4,
wherein the prism includes:
a transparent first plate portion fixed on the imaging element side;
a transparent second plate portion disposed on the lens side;
a stretchable portion disposed between the first plate portion and the second plate portion, and in which a transparent stretchable bag-like medium is filled with a liquid; and
an actuator configured to tilt the second plate portion and change the shape of the stretchable portion.

(Supplementary Note 6)
The imaging apparatus according to Supplementary Note 4, further comprising
a hollow shaft motor configured to rotate a cylindrical rotation hollow shaft;
wherein the hollow shaft motor is configured to rotate the prism inside the rotation hollow shaft.

(Supplementary Note 7)
An optical system comprising:
a display element configured to display an image;
a lens configured to deflect and converge light; and
a prism disposed in an optical path between the display element and the lens,
wherein a virtual image of a surface of the display element is formed in the prism and a projected surface is at a position conjugate with the virtual image with the lens interposed therebetween.

(Supplementary Note 8)
The optical system according to Supplementary Note 7, wherein the prism includes:
a transparent first plate portion fixed on the imaging element side;
a transparent second plate portion disposed on the lens side;
a stretchable portion disposed between the first plate portion and the second plate portion, and in which a transparent stretchable bag-like medium is filled with a liquid; and an actuator configured to tilt the second plate portion and change the shape of the stretchable portion.

(Supplementary Note 9)

The optical system according to Supplementary Note 7, further comprising
  a hollow shaft motor configured to rotate a cylindrical rotation hollow shaft;
  wherein the hollow shaft motor is configured to rotate the prism inside the rotation hollow shaft.

(Supplementary Note 10)

A projection apparatus comprising:
  a display element configured to display an image;
  a lens configured to deflect and converge light; and
  a prism disposed in an optical path between the display element and the lens,
  wherein a virtual image of a surface of the display element is formed in the prism and a projected surface is at a position conjugate with the virtual image with the lens interposed therebetween.

(Supplementary Note 11)

The projection apparatus according to Supplementary Note 10,
  wherein the prism includes:
    a transparent first plate portion fixed on the imaging element side;
    a transparent second plate portion disposed on the lens side;
    a stretchable portion disposed between the first plate portion and the second plate portion, and in which a transparent stretchable bag-like medium is filled with a liquid; and
    an actuator configured to tilt the second plate portion and change the shape of the stretchable portion.

(Supplementary Note 12)

The projection apparatus according to Supplementary Note 10, further comprising
  a hollow shaft motor configured to rotate a cylindrical rotation hollow shaft;
  wherein the hollow shaft motor is configured to rotate the prism inside the rotation hollow shaft.

Although the present invention of this application has been described with reference to example embodiments, the present invention of this application is not limited to the above example embodiments. Within the scope of the present invention of this application, various changes that can be understood by those skilled in the art can be made to the configuration and details of the present invention of this application.

INDUSTRIAL APPLICABILITY

As described above, according to the present invention, an optical system capable of focusing on multiple locations, and that is small and inexpensive, and an imaging apparatus and a projection apparatus using the optical system can be provided. The present invention is useful in a field in which object recognition such as face authentication and iris authentication, and image projection are required.

REFERENCE SIGNS LIST 10, 101, 111, 600 optical system
11 imaging element
12 lens
13 prism
14 light receiving surface
15, 602 virtual image
16 focusing surface
20, 102, 112 control unit
100 imaging apparatus
200 information processing apparatus
300 network
402, 502 prism portion
403 plate portion
404 stretchable portion
405 actuator
503 hollow shaft motor
504 rotation hollow shaft
601 display element
603 projected surface

What is claimed is:

1. An optical system comprising:
  an imaging element configured to convert light into an electric signal;
  a lens configured to deflect and converge the light; and
  a prism disposed in an optical path between the imaging element and the lens,
  wherein a virtual image of a light receiving surface of the imaging element is formed in the prism and a focusing surface is at a position conjugate with the virtual image with the lens interposed therebetween.

2. The optical system according to claim 1,
  wherein the prism includes:
    a transparent first plate portion fixed on the imaging element side;
    a transparent second plate portion disposed on the lens side;
    a stretchable portion disposed between the first plate portion and the second plate portion, and in which a transparent stretchable bag-like medium is filled with a liquid; and
    an actuator configured to tilt the second plate portion and change the shape of the stretchable portion.

3. The optical system according to claim 1, further comprising
  a hollow shaft motor configured to rotate a cylindrical rotation hollow shaft;
  wherein the hollow shaft motor is configured to rotate the prism inside the rotation hollow shaft.

4. An imaging apparatus comprising:
  an imaging element configured to convert light into an electric signal;
  a lens configured to deflect and converge the light; and
  a prism disposed in an optical path between the imaging element and the lens,
  wherein a virtual image of a light receiving surface of the imaging element is formed in the prism and a focusing surface is at a position conjugate with the virtual image with the lens interposed therebetween.

5. The imaging apparatus according to claim 4,
  wherein the prism includes:
    a transparent first plate portion fixed on the imaging element side;
    a transparent second plate portion disposed on the lens side;
    a stretchable portion disposed between the first plate portion and the second plate portion, and in which a transparent stretchable bag-like medium is filled with a liquid; and
    an actuator configured to tilt the second plate portion and change the shape of the stretchable portion.

6. The imaging apparatus according to claim 4, further comprising a hollow shaft motor configured to rotate a cylindrical rotation hollow shaft;

wherein the hollow shaft motor is configured to rotate the prism inside the rotation hollow shaft.

7. An optical system comprising:
a display element configured to display an image;
a lens configured to deflect and converge light; and
a prism disposed in an optical path between the display element and the lens,
wherein a virtual image of a surface of the display element is formed in the prism and a projected surface is at a position conjugate with the virtual image with the lens interposed therebetween.

* * * * *